United States Patent
Maeda

(10) Patent No.: US 12,222,442 B2
(45) Date of Patent: Feb. 11, 2025

(54) RANGING SYSTEM, CALIBRATION METHOD, PROGRAM, AND ELECTRONIC APPARATUS

(71) Applicant: Sony Semiconductor Solutions Corporation, Kanagawa (JP)

(72) Inventor: Shunji Maeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1003 days.

(21) Appl. No.: 17/276,638

(22) PCT Filed: Sep. 26, 2019

(86) PCT No.: PCT/JP2019/037734
§ 371 (c)(1),
(2) Date: Mar. 16, 2021

(87) PCT Pub. No.: WO2020/075506
PCT Pub. Date: Apr. 16, 2020

(65) Prior Publication Data
US 2022/0043113 A1    Feb. 10, 2022

(30) Foreign Application Priority Data
Oct. 10, 2018    (JP) ................................ 2018-191377

(51) Int. Cl.
*G01S 7/48*    (2006.01)
*G01S 7/497*    (2006.01)
(Continued)

(52) U.S. Cl.
CPC ............ *G01S 7/4802* (2013.01); *G01S 7/497* (2013.01); *G01S 17/10* (2013.01); *G01S 17/894* (2020.01); *G01S 17/931* (2020.01)

(58) Field of Classification Search
USPC ....................................................... 356/5.01
See application file for complete search history.

(56) References Cited

U.S. PATENT DOCUMENTS

| 7,009,091 B2 * | 3/2006 | Leske ................... A01H 6/604 800/300 |
| 7,586,077 B2 * | 9/2009 | Lehmann ................ G01S 7/497 250/214 R |

(Continued)

FOREIGN PATENT DOCUMENTS

| CN | 101027574 A | 8/2007 |
| CN | 102650691 A | 8/2012 |

(Continued)

OTHER PUBLICATIONS

V. M. Kovalskii, A. A. Vorotnikov, N. A. Lepilina and Y. V. Poduraev, "The Concept of an Automated Stand for the Calibration of Angle Position Sensors," 2020 International Multi-Conference on Industrial Engineering and Modern Technologies (FarEastCon), Vladivostok, Russia, 2020, pp. 1-5, (Year: 2020).*

(Continued)

*Primary Examiner* — James R Hulka
(74) *Attorney, Agent, or Firm* — Michael Best & Friedrich LLP

(57) ABSTRACT

Ranging systems, calibration methods, programs, and electronic apparatus with lower cost calibration are disclosed. In one example, a ranging system includes a light source, a sensor that detects reflection light of light emitted from the light source and reflected on a target object, a determination unit that determines whether or not a peripheral object is usable as a reflection object on the basis of a predetermined determination condition, and a generation unit that generates a correction table for correcting an offset value between a true value of a range value and a measured value on the basis of a detection result received from the sensor and obtained by detecting reflection light of light applied from the light source to a target object usable as the reflection object in a (Continued)

case where the peripheral object is determined to be usable as the reflection object.

18 Claims, 20 Drawing Sheets

(51) Int. Cl.
    *G01S 17/10* (2020.01)
    *G01S 17/894* (2020.01)
    *G01S 17/931* (2020.01)

(56) References Cited

U.S. PATENT DOCUMENTS

| | | | |
|---|---|---|---|
| 9,823,352 B2* | 11/2017 | Meinherz | G01S 17/894 |
| 2005/0110977 A1 | 5/2005 | LaBelle | |
| 2009/0020687 A1 | 1/2009 | Lehmann et al. | |
| 2014/0092416 A1 | 4/2014 | Ogata | |
| 2016/0124089 A1 | 5/2016 | Meinherz | |
| 2017/0153328 A1* | 6/2017 | Lavi | G01S 17/58 |

FOREIGN PATENT DOCUMENTS

| | | |
|---|---|---|
| CN | 105572681 A | 5/2016 |
| CN | 105717497 A | 6/2016 |
| CN | 106524922 A | 3/2017 |
| EP | 0 828 165 A2 | 3/1998 |
| JP | 06-242243 A | 9/1994 |
| JP | 2004-233106 A | 8/2004 |
| JP | 2010-025906 A | 2/2010 |
| TW | 201637440 A | 10/2016 |

OTHER PUBLICATIONS

International Search Report (PCT/ISA/210), International Application No. PCT/JP2019/037734, dated Nov. 14, 2019.
Notification of Transmittal of the International Search Report and the Written Opinion of the International Searching Authority, or the Declaration (PCT/ISA/220), International Application No. PCT/JP2019/037734, dated Nov. 26, 2019.
Written Opinion of the International Search Authority (PCT/ISA/237), International Application No. PCT/JP2019/037734, dated Nov. 26, 2019.

* cited by examiner

RANGING SYSTEM, CALIBRATION METHOD, PROGRAM, AND ELECTRONIC APPARATUS

TECHNICAL FIELD

The present disclosure relates to a ranging system, a calibration method, a program, and an electronic apparatus, and particularly to a ranging system, a calibration method, a program, and an electronic apparatus each capable of achieving calibration at a lower cost.

BACKGROUND ART

A ranging apparatus such as a TOF (Time of Flight) sensor produces various offsets between true values (ground truths) of range values and measured distances (calculated). Accordingly, the ranging apparatus generally performs calibration (e.g., see PTL 1).

CITATION LIST

Patent Literature

[PTL 1]
U.S. Patent Application Publication No. 2009/0020687

SUMMARY

Technical Problem

However, calibration requires preparation of a device dedicated for calibration, and a sufficient time for measurement. Accordingly, a technology achieving calibration at a lower cost has been demanded.

The present disclosure has been developed in consideration of the aforementioned circumstances, and can achieve calibration at a lower cost.

Solution to Problem

A ranging system according to one aspect of the present disclosure is a ranging system including a light source unit that emits light, a sensor unit that detects reflection light of light emitted from the light source unit and reflected on a target object, a determination unit that determines whether or not a peripheral object is usable as a reflection object on the basis of a predetermined determination condition, and a generation unit that generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

A calibration method according to one aspect of the present disclosure is a calibration method, in which a control apparatus determines whether or not a peripheral object is usable as a reflection object on the basis of a predetermined condition, and generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

A program according to one aspect of the present disclosure is a program causing a computer to function as a determination unit that determines whether or not a peripheral object is usable as a reflection object on the basis of a predetermined determination condition, and a generation unit that generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

An electronic apparatus according to one aspect of the present disclosure is an electronic apparatus including a ranging system that includes a light source unit that emits light, a sensor unit that detects reflection light of light emitted from the light source unit and reflected on a target object, a determination unit that determines whether or not a peripheral object is usable as a reflection object on the basis of a predetermined determination condition, and a generation unit that generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

The ranging apparatus, the calibration method, the program, and the electronic apparatus according to one aspect of the present disclosure determines whether or not a peripheral object is usable as a reflection object on the basis of a predetermined determination condition, and generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

Note that each of the ranging apparatus, the control apparatus, and the electronic apparatus constituting the ranging system according to one aspect of the present disclosure may be an independent apparatus, or may be an internal block constituting one apparatus.

DESCRIPTION OF EMBODIMENTS

Figure 1:
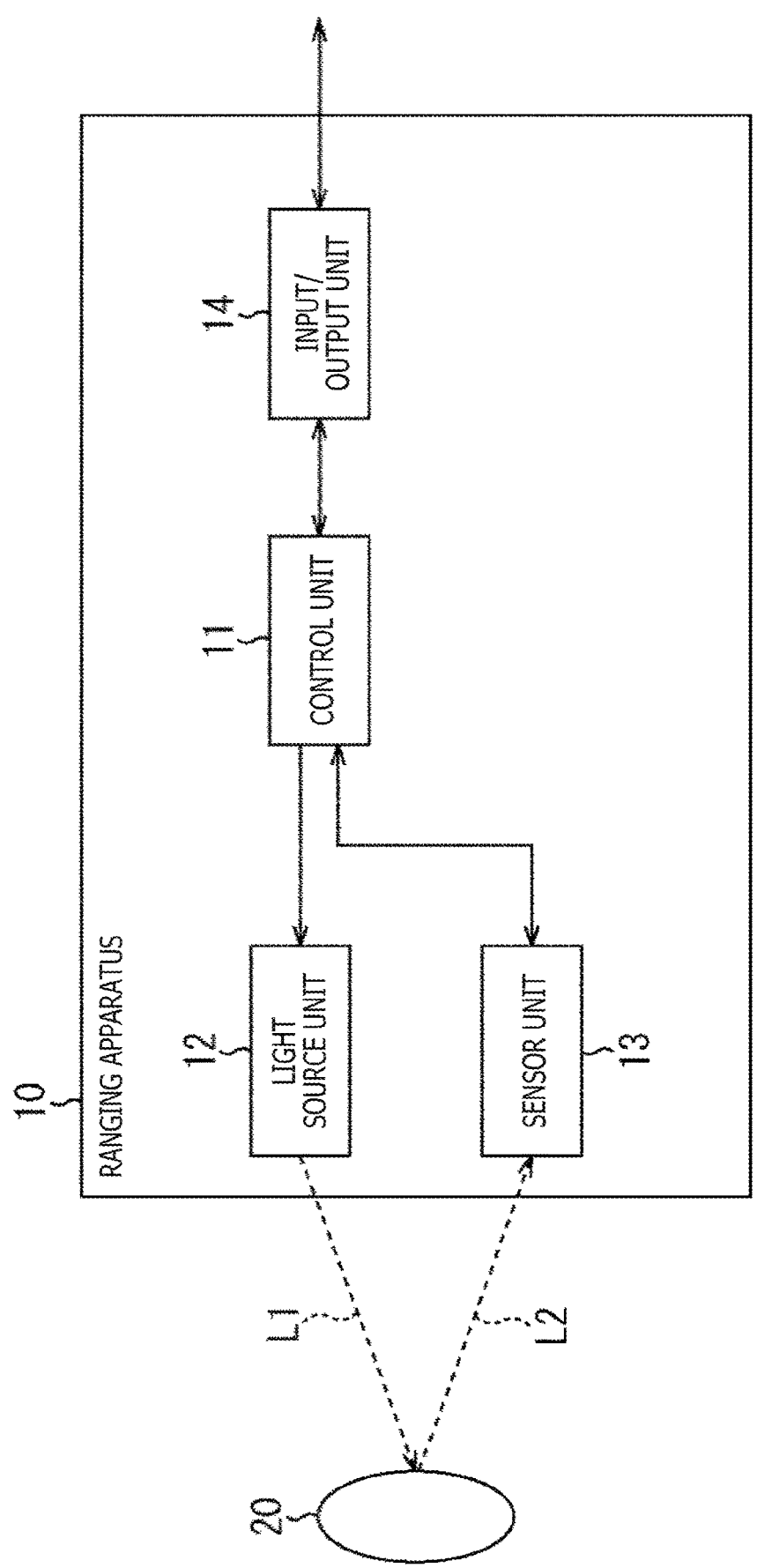
FIG. 1 is a block diagram depicting a configuration example of a ranging apparatus to which the technology according to the present disclosure is applied.

Embodiments of the technology according to the present disclosure (present technology) will be hereinafter described with reference to the drawings. Note that the description will be presented in a following order.

1. First embodiment
2. Second embodiment
3. Third embodiment
4. Fourth embodiment
5. Fifth embodiment
6. Sixth embodiment
7. Examples of application to mobile body

1. First Embodiment (Configuration Example of Ranging Apparatus)

FIG. 1 is a block diagram depicting a configuration example of a ranging apparatus to which the technology according to the present disclosure is applied.

For example, a ranging apparatus 10 in FIG. 1 is constituted as a range image sensor or the like using a TOF (Time of Flight) system.

The ranging apparatus 10 in FIG. 1 includes a control unit 11, a light source unit 12, a sensor unit 13, and an input/output unit 14.

For example, the control unit 11 includes a microcomputer, various types of circuit units, and others. The control unit 11 operates as a main processing device of the ranging apparatus 10 for performing control of operations of respective units, various types of computing processes, and the like.

The light source unit 12 applies light to a target object 20 under control by the control unit 11. For example, the light source unit 12 is capable of emitting modulated light (rectangular pulse light), which is light (laser light) modulated by rectangular pulse waves or the like, and applying the modulated light to the target object 20 using a device capable of achieving high-speed modulation such as an LED (Light Emitting Diode).

When light is applied to the target object 20 by the light source unit 12, irradiation light L1 applied to the target object 20 is reflected on the target object 20 at reflectance of the target object 20. Reflection light L2 thus produced enters a sensor unit 13 via a lens (not depicted).

For example, the sensor unit 13 includes an element such as a solid-state imaging element including CMOS (Complementary Metal Oxide Semiconductor). This solid-state imaging element includes a plurality of pixels each having a photoelectric conversion element and two-dimensionally arranged.

The control unit 11 controls synchronization between the light source unit 12 and the sensor unit 13. The sensor unit 13 performs a shutter operation under control by the control unit 11 to image the reflection light L2 received from the target object 20, and outputs an imaging result (exposure value) to the control unit 11.

The control unit 11 calculates an exposure value ratio corresponding to the shutter operation by using the imaging result (exposure value) received from the sensor unit 13, and generates distance information (distance image) according to a calculation result thus obtained. A time required for returning the reflection light varies herein for each irradiation position when modulated light is applied to the target object 20, for example. Accordingly, the distance information can be generated on the basis of the time calculated from the exposure value ratio obtained for every two continuous shutter operations of a first shutter and a second shutter.

The input/output unit 14 includes an input/output interface circuit corresponding to a predetermined system, and inputs or outputs data exchanged between the control unit 11 and an external device.

The ranging apparatus 10 configured as above is a TOF-type range image sensor which uses modulated light (active light) modulated as a light source, and adopts what is called an indirect system.

The TOF type herein includes a direct system which measures TOF in a direct time domain. The indirect system is a system other than such a direct system. In other words, the indirect system is a system which performs measurement by using a physical value change dependent on TOF, and a time reference for converting the physical value change into a time change. Note that the ranging apparatus 10 of the TOF system adopting the indirect system will be also referred to as the indirect-type ranging apparatus 10 in the following description.

(Configuration Example of Electronic Apparatus)

Figure 2:
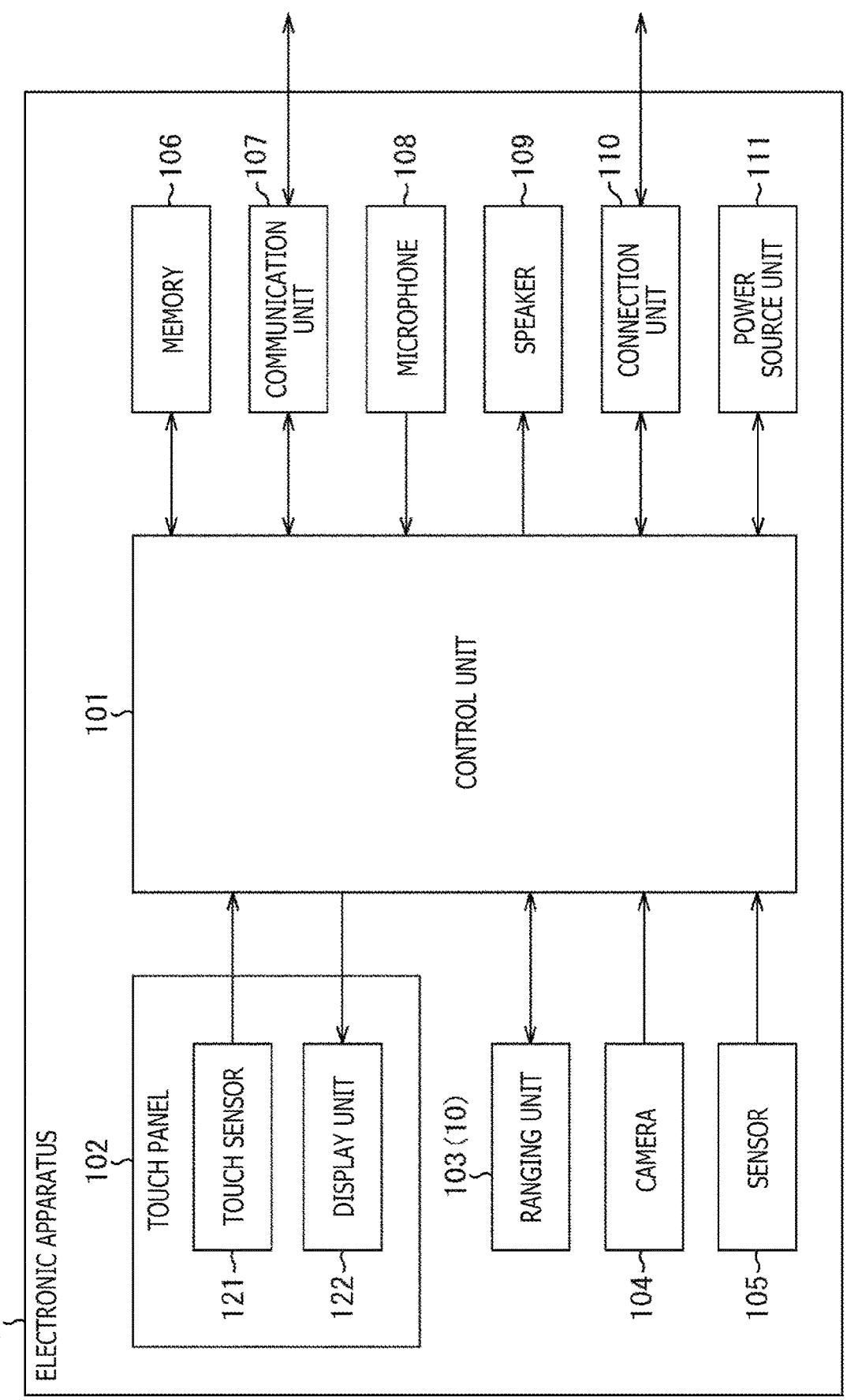
FIG. 2 is a block diagram depicting a configuration example of an electronic apparatus including the ranging apparatus to which the technology according to the present disclosure is applied.

FIG. 2 is a block diagram depicting a configuration example of an electronic apparatus including the ranging apparatus to which the technology according to the present disclosure is applied.

For example, an electronic apparatus 100 depicted in FIG. 2 constitutes a portable terminal such as a smartphone, a cellular phone, a tablet-type terminal, and a game machine, a wearable terminal such as a watch-type terminal and a glass-type terminal, and others.

The electronic apparatus 100 in FIG. 2 includes a control unit 101, a touch panel 102, a ranging unit 103, a camera 104, a sensor 105, a memory 106, a communication unit 107, a microphone 108, a speaker 109, a connection unit 110, and a power source unit 111.

For example, the control unit 101 includes a CPU (Central Processing Unit), a microprocessor, an FPGA (Field Programmable Gate Array), and the like. The control unit 101 operates as a main processing device of the electronic apparatus 100 for performing various types of computing processes, operation control for respective units, and others.

The touch panel 102 includes a touch sensor 121 and a display unit 122. The touch sensor 121 herein is stacked on a screen of the display unit 122.

The touch sensor 121 detects an input operation (e.g., a tap operation and a flick operation) performed by a user for the touch panel 102 together with a position where the operation is performed on the touch panel 102, and supplies a detection signal indicating these operation and position to the control unit 101. For example, the display unit 122 includes a liquid crystal display, an organic EL display, or other types of display. The display unit 122 displays various types of information such as text, images, motion videos under control by the control unit 101.

The ranging unit 103 is configured in correspondence with the ranging apparatus 10 in FIG. 1. The ranging unit 103 performs a ranging operation under control by the control unit 101, and outputs data indicating distance information (distance image) obtained by the ranging operation.

The camera 104 includes an image sensor such as a CMOS (Complementary Metal Oxide Semiconductor) image sensor and a CCD (Charge Coupled Device) image sensor, and a signal processing unit such as a camera ISP (Image Signal Processor).

For a signal obtained by imaging an object using the image sensor, the camera 104 performs processing such as a correction process for an optical system such as a lens, a correction process for handling variations and the like of the image sensor, and processes associated with exposure, focus, white balance, and others. The camera 104 supplies captured image data thus obtained to the control unit 101.

The sensor 105 includes various types of sensors. The sensor 105 performs sensing for obtaining various types of information associated with the user and surroundings of the user, and supplies data received from the sensors and indicating sensing results thus obtained to the control unit 101.

For example, the sensor 105 can include an ambient light sensor for detecting ambient brightness, a biosensor for detecting biological information such as a fingerprint, an iris, and a pulse, a magnetic sensor for detecting a size and a direction of a magnetic field (magnetic field), an acceleration sensor for detecting an acceleration, a gyro sensor for detecting an angle (posture), an angular speed, and an angular acceleration, a proximity sensor for detecting an adjacent object, or other various types of sensors.

For example, the memory 106 includes a semiconductor memory such as a non-volatile memory (e.g., an NVRAM (Non-Volatile RAM)). The memory 106 stores various types of data under control by the control unit 101.

For example, the communication unit 107 includes a communication module or the like capable of handling cellular type communication (e.g., LTE-Advanced and 5G), or wireless communication such as a wireless LAN (Local Area Network). The communication unit 107 exchanges various types of data with various types of servers or the like via a network such as the Internet under control by the control unit 101.

The microphone 108 is a device (sound collector) which converts sounds (voices) received from the outside into electric signals. The microphone 108 supplies sound signals thus converted to the control unit 101. The speaker 109 outputs sounds (voices) corresponding to electric signals such as sound signals under control by the control unit 101.

The connection unit 110 includes an input/output interface circuit corresponding to a predetermined communication system, and inputs or outputs data, power, and the like exchanged between the control unit 101 and an external device. The power source unit 111 supplies supply power obtained from a storage battery or an external power source to the control unit 101 and other respective units of the electronic apparatus 100 under control by the control unit 101.

The electronic apparatus 100 configured as above has various functions. As one of these functions, it is possible to generate distance information (distance image) by performing a ranging operation using the ranging unit 103 (the ranging apparatus 10).

The ranging unit 103 (the ranging apparatus 10) herein produces various offsets between true values of range values and measured distances (measured values). Accordingly, a table for correcting these offset values by calibration (hereinafter referred to as a correction table) is generated. Thereafter, the measured distance (measured value) is corrected using the generated correction table during ranging by the ranging unit 103 (the ranging apparatus 10).

Figure 3:
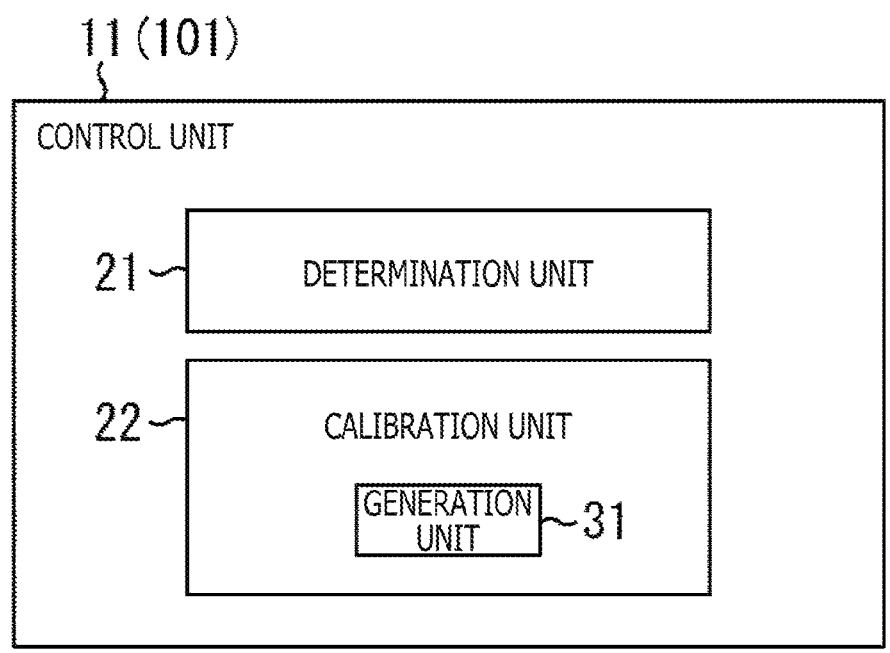
FIG. 3 is a block diagram depicting a configuration example of a control unit.

Note that the control unit 11 of the ranging apparatus 10 or the control unit 101 of the electronic apparatus 100 includes a determination unit 21 and a calibration unit 22 which are depicted in FIG. 3 to execute the calibration. Details of this point will be described below. Moreover, the calibration unit 22 (FIG. 3) includes a generation unit 31 for generating the correction table. Note that the correction table generated by the generation unit 31 is stored in a storage apparatus such as a memory, and read and used in an appropriate manner.

Figure 4:
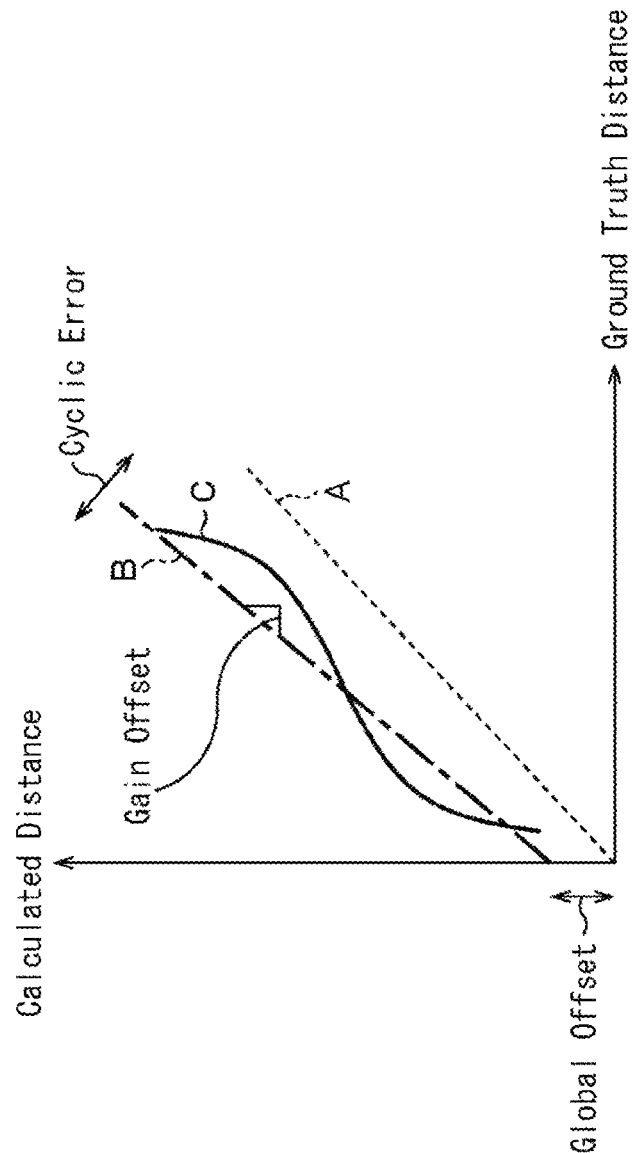
FIG. 4 is a diagram depicting an example of a correction table for calibration.

FIG. 4 depicts an example of the correction table for calibration.

In FIG. 4, a horizontal axis (x axis) represents a true value (Ground Truth Distance) of a range value, while a vertical axis (y axis) represents a measured distance (Calculated Distance).

In FIG. 4, a straight line A represented by a dotted line indicates an ideal relationship between the true value of the range value and the measured distance. However, the straight line A actually contains offsets as indicated by a straight line B represented by a one-dot chain line. A y-intercept of the straight line B represents a global offset, while a slope of the straight line B represents a gain offset.

The indirect-type ranging apparatus 10 herein includes a cyclic error as a peculiar offset. This error is indicated by a solid line represented by a curved line C. Specifically, in a case where the indirect type is adopted as the ranging apparatus 10, a correction table including the relationship indicated by the curved line C needs to be stored.

Figure 5:
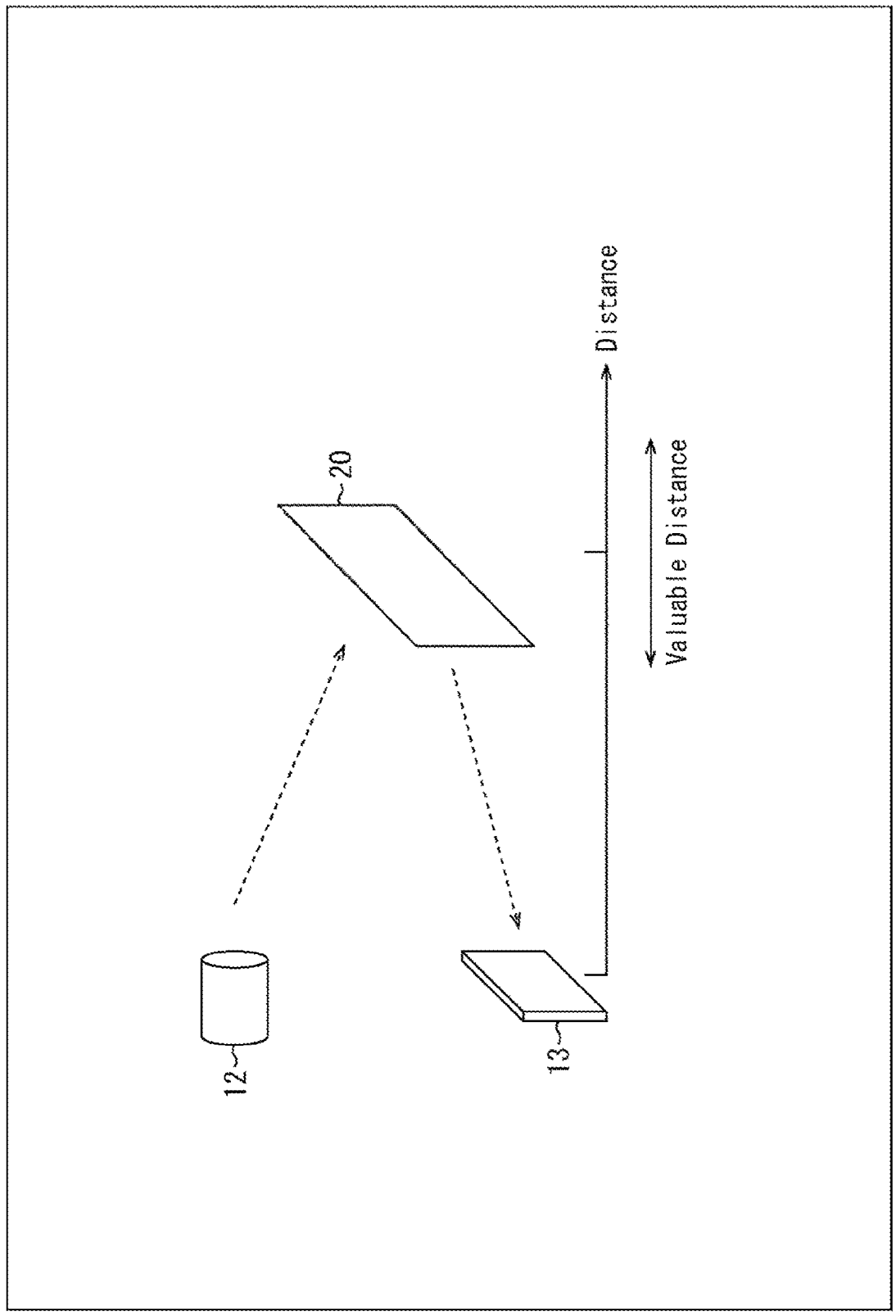
FIG. 5 is a diagram depicting a first example of calibration.
Figure 6:
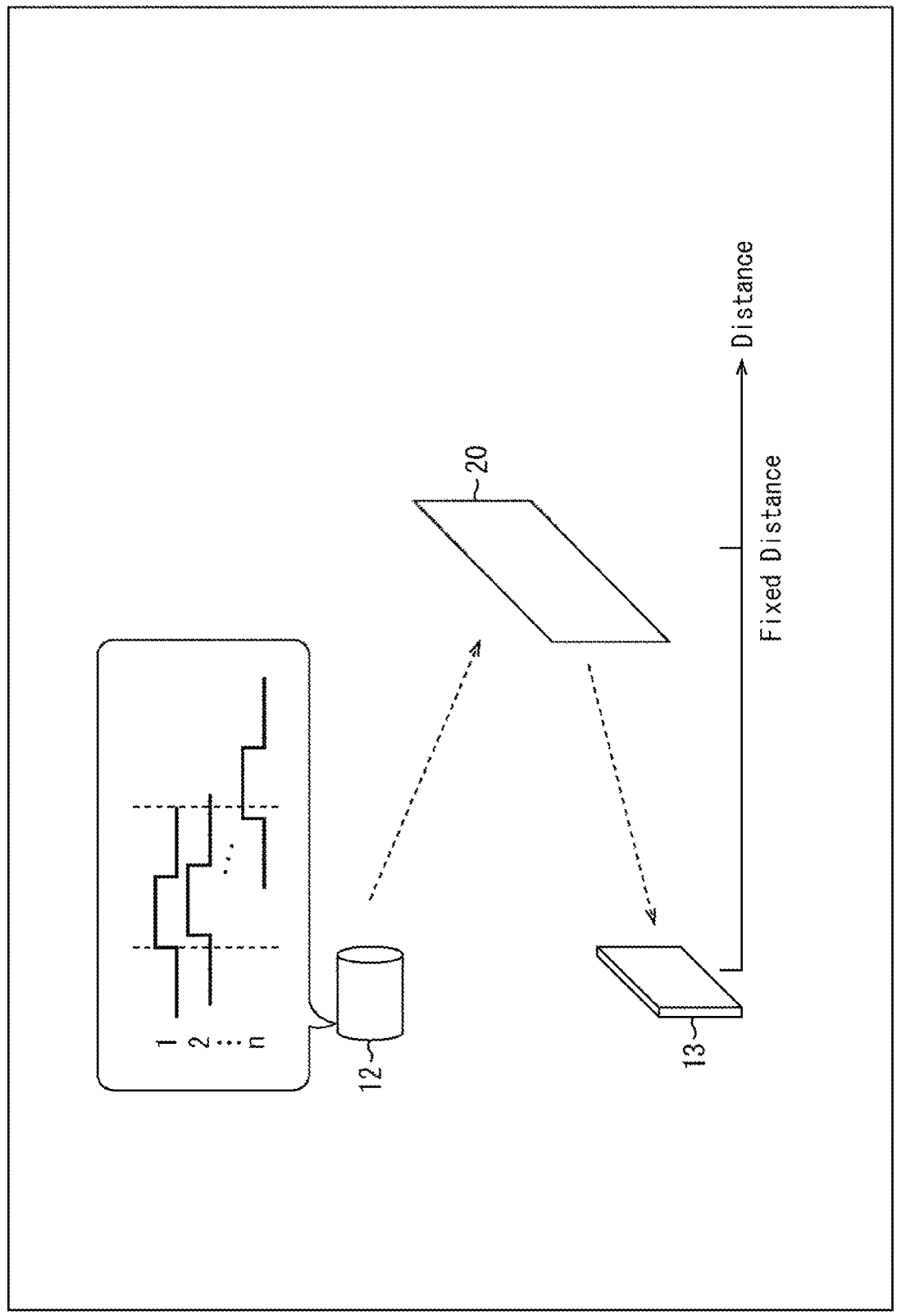
FIG. 6 is a diagram depicting a second example of calibration.
Figure 7:
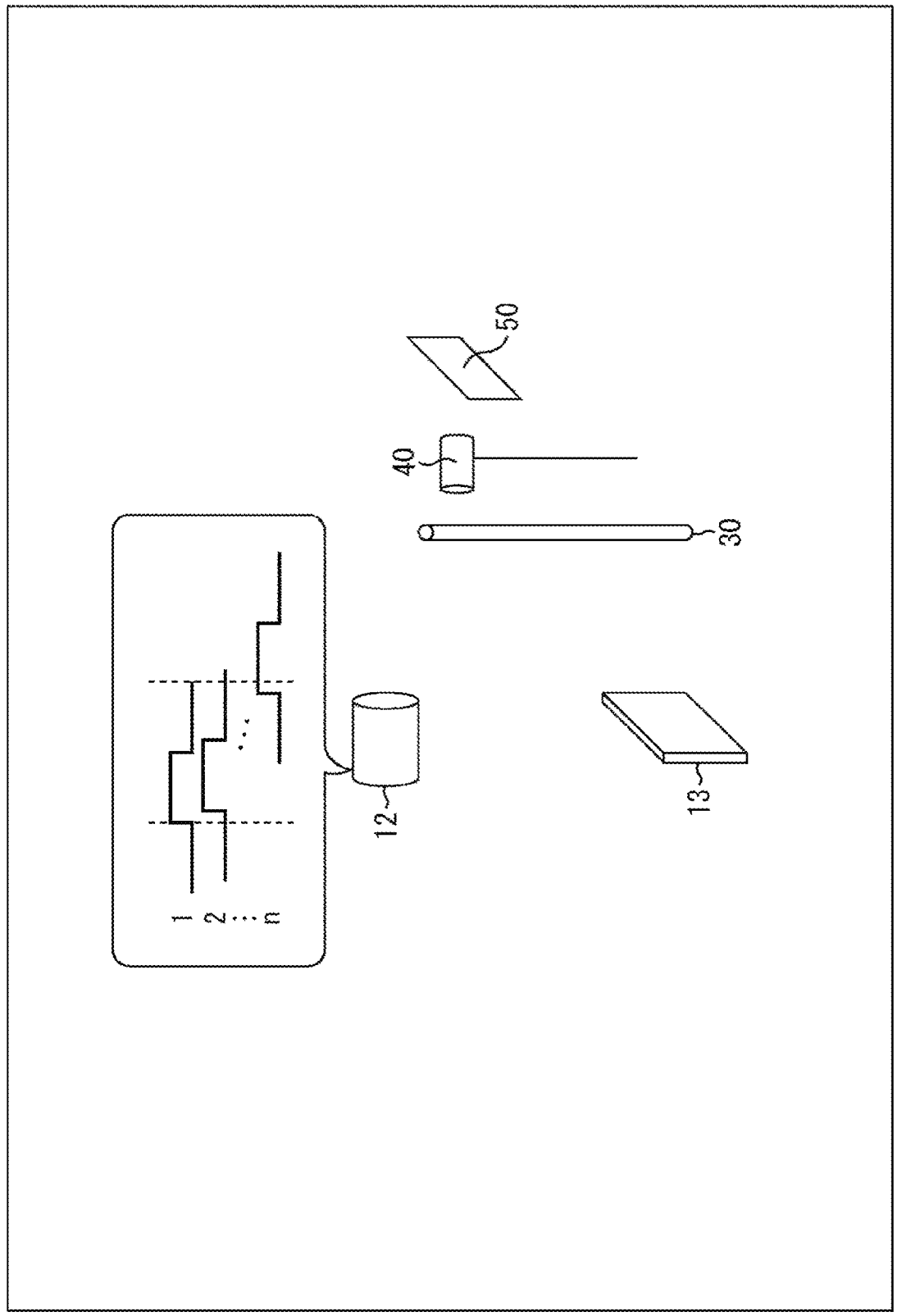
FIG. 7 is a diagram depicting a third example of calibration.

For example, there are three methods depicted in FIGS. 5 to 7 and each assumed as a method for generating such a correction table.

In a first method, reflection light of light emitted from the light source unit 12 and applied to the target object 20 such as a wall is detected using the sensor unit 13 while moving the target object 20 with respect to the ranging apparatus 10. A correction table based on a detection result is generated (FIG. 5).

This first method requires a time for measurement, and also a large-scale device for moving the target object 20 to physically moving the target object 20 such as a wall. Moreover, the first method is carried out at the time of shipment, and a correction table is generated at that time (by plotting measured values). The ranging apparatus 10 storing the correction table thus generated is shipped.

In a second method, the target object 20 such as a wall is fixed, and reflection light of light emitted from the light source unit 12 of the ranging apparatus 10 is detected using the sensor unit 13 while changing emission timing of the light. A correction table based on a detection result thus obtained is generated (FIG. 6). Rectangular pulse light emitted from the light source unit 12 is depicted in a balloon of FIG. 6 herein. For example, the timing is changed by early emission and late emission for each rectangular pulse light repeatedly emitted n (n: one or larger integer) times or other numbers of times.

This second method can achieve electrically handling without the necessity of physically moving the target object 20. Accordingly, the time required for measurement can be more reduced than in the first method. However, a special PLL (Phase locked Loop) circuit is needed. Moreover, the second method is assumed to be performed at the time of shipment similarly to the first method.

In a third method, a calibration path is formed by providing a dedicated optical fiber 30, and reflection light of light emitted from the light source unit 12 using this path is detected using the sensor unit 13. A correction table based on a detection result thus obtained is generated (FIG. 7). However, it is assumed herein that light (waveform of light) is detected using a photo detector 40, or that light is reflected by a reflector 50. In addition, according to the third method, measurement is performed while changing emission timing of light from the light source unit 12 similarly to the second method.

This third method additionally requires parts or a mechanism for providing the dedicated optical fiber 30 or the like. Accordingly, a higher cost is needed. Moreover, the third method prepares the calibration path, and therefore calibration is allowed to be performed after shipment of the ranging apparatus 10 (in the field) without the necessity of performing calibration at the time of shipment.

As described above, the calibration correction table can be generated by using the above three methods. However, the cost for calibration increases by the necessity of performing calibration at the time of shipment, preparing the dedicated device, or securing a sufficient measurement time.

Accordingly, a technology for performing calibration at a lower cost even after shipment has been demanded. For meeting this demand, a technology for performing calibration at a lower cost will be proposed as the technology of the present disclosure.

(Example of Calibration)

Figure 8:
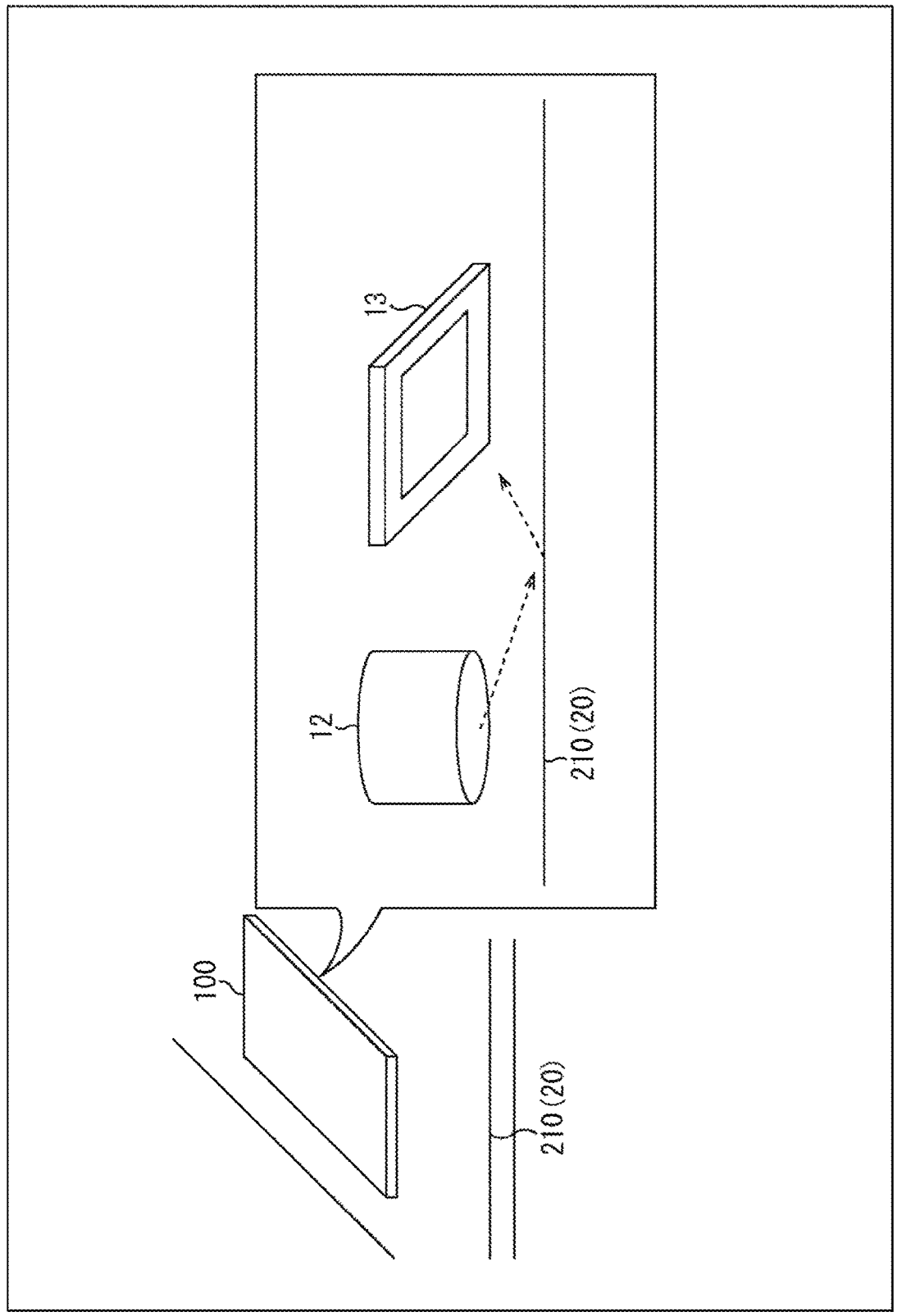
FIG. 8 is a diagram depicting a first example of calibration performed by the electronic apparatus which includes the ranging apparatus to which the technology according to the present disclosure is applied.

FIG. 8 depicts a first example of calibration performed by the electronic apparatus including the ranging apparatus to which the technology according to the present disclosure is applied.

In a case where the electronic apparatus 100 (e.g., a portable terminal such as a smartphone) including the ranging apparatus 10 (the ranging unit 103) is carried by the user, the target object 20 which may become a reflection object exists on the side of the ranging apparatus 10 in some cases when the electronic apparatus 100 is placed on a desk, or put into a bag, a case, or a pocket of clothes, for example.

For example, calibration in FIG. 8 is performed using a surface of a desk 210 corresponding to the target object 20 as a reflection object (reflector) in a case where the electronic apparatus 100 (e.g., a portable terminal) including the ranging apparatus 10 (the ranging unit 103) is placed on the desk 210 in a face down state.

Note that a surface (second face) of the desk 210 present at an extremely short distance from the light source unit 12 and the sensor unit 13 is used as the reflection object in a state (hereinafter also referred to as a first state) where the ranging unit 103 (the light source unit 12 and the sensor unit 13 of the ranging unit 103) is provided on a surface (first surface) on the front surface side or the rear surface side (front side or rear side) of a housing of the electronic apparatus 100, and also in a state where the surface (first surface) on which the ranging unit 103 is provided is turned face down.

In this manner, calibration can be performed without using a dedicated device or the like in the first example. Accordingly, calibration is easily achievable without the necessity of a physical cost. Moreover, calibration in the first example is performed without awareness by the user on such an occasion when the electronic apparatus 100 is placed on a desk, or put into a bag, a case, or a pocket of clothes, for example. Accordingly, the necessity of securing a sufficient time for calibration is eliminated, and cost (time cost) reduction is achievable in terms of time.

(Flow of Processing)

A flow of the first example of the calibration process executed under control by the control unit 11 or the control unit 101 will be subsequently described with reference to a flowchart in FIG. 9.

In step S11, the control unit 11 (or the control unit 101) measures a light amount. Examples adopted as a method for measuring this light amount include a method which measures incident light entering the sensor unit 13. Note that the light amount herein may be measured using a sensor such as a luminance sensor provided as the sensor 105 of the electronic apparatus 100.

In step S12, the determination unit 21 determines whether or not the light amount measured (measured light amount) falls within a predetermined range on the basis of a result of the light amount measurement.

For example, it may be determined herein that the surface side where the ranging unit 103 is provided (front face side or rear face side) is dark in the first state of the electronic apparatus 100 placed on the desk 210 in a case of determination that the measured light amount is a predetermined threshold or smaller on the basis of a comparison between the measured light amount and the predetermined threshold. Note that the threshold to be compared with the measured light amount may be a given value set beforehand.

In a case of determination in step S12 that the measured light amount falls within the predetermined range, i.e., that the surface side of the electronic apparatus 100 where the ranging unit 103 is provided is not dark, the process proceeds to step S13. In step S13, the control unit 11 (or the control unit 101) waits for $M_1$ seconds.

After an elapse of $M_1$ seconds, the process subsequently returns to step S11. Processing in steps S11 and S12 is then performed to again determine whether or not the measured light amount is out of the predetermined range. Thereafter, processing from step S11 to step S13 is repeated. In a case of determination that the measured light amount is out of the predetermined range, i.e., that the surface side of the electronic apparatus 100 where the ranging unit 103 is provided is dark, the process proceeds to step S14.

By repeating the light amount measurement and the determination process for this measurement in the manner described above, a state where the electronic apparatus 100 is placed on the desk 210 in the first state, and a state where the electronic apparatus 100 is accommodated in a case or put into a bag or a pocket of clothes, or like states are detected, for example, when the incident light entering the sensor unit 13 decreases as a result of such a state where at least one of the surface sides of the electronic apparatus 100 has become dark, for example.

In step S14, the control unit 11 (or the control unit 101) controls the light source unit 12 and the sensor unit 13 to perform a ranging operation.

In step S15, the determination unit 21 determines whether or not the target object 20 is present within a predetermined extremely short distance on the basis of ranging information obtained by the ranging operation. Light is applied from the light source unit 12 herein to attempt surface detection of the target object 20 (e.g., the desk 210) which is a surface usable as a reflection object (reflector) within the extremely short distance.

In a case of determination in step S15 that the target object 20 is absent within the predetermined extremely short distance, the process returns to step S11 to repeat processing from step S11 to step S15.

On the other hand, in a case of determination in step S15 that the target object 20 is present within the predetermined extremely short distance, the process proceeds to step S16. In step S16, the determination unit 21 determines whether or not the distance to the target object 20 changes after $N_1$ trials of the ranging operation.

In a case of determination in step S16 that the distance to the target object 20 has changed after $N_1$ trials, the process proceeds to step S17. In step S17, the control unit 11 (or the control unit 101) waits for $M_2$ seconds.

After an elapse of $M_2$ seconds, the process subsequently returns to step S14 to repeat the subsequent processing. Specifically, in a case where the distance to the target object 20 has changed after $N_1$ trials of the ranging operation, there is a possibility that erroneous detection or the like has been made. In this case, it is unable to use the target object 20 as the reflection object. Accordingly, a new ranging operation is again performed to start over the detection of the target object 20.

On the other hand, in a case of determination in step S16 that the distance to the target object 20 does not change even after $N_1$ trials, the process proceeds to step S18. In step S18, the calibration unit 22 executes calibration using the target object 20, which is a target of determination (e.g., a surface of the desk 210, a wall, and an inside of a bag, a case, or a pocket of clothes), as the reflection object.

For example, this calibration is performed by detecting reflection light from the target object 20 (e.g., the surface of the desk 210) using the sensor unit 13 while changing emission timing of light (rectangular pulse light) from the light source unit 12 (gradually changing a phase of the light source) similarly to the second method described above (FIG. 6). In this manner, the generation unit 31 generates a correction table based on a detection result thus obtained (e.g., C in FIG. 4).

The correction table thus generated includes the cyclic error indicated by C in FIG. 4, and therefore is a correction table corresponding to the indirect-type ranging apparatus 10. Note that the method which changes the phase of the light source as the method for generating the correction table described above is presented only by way of example. The correction table may be generated using other methods.

Figure 9:
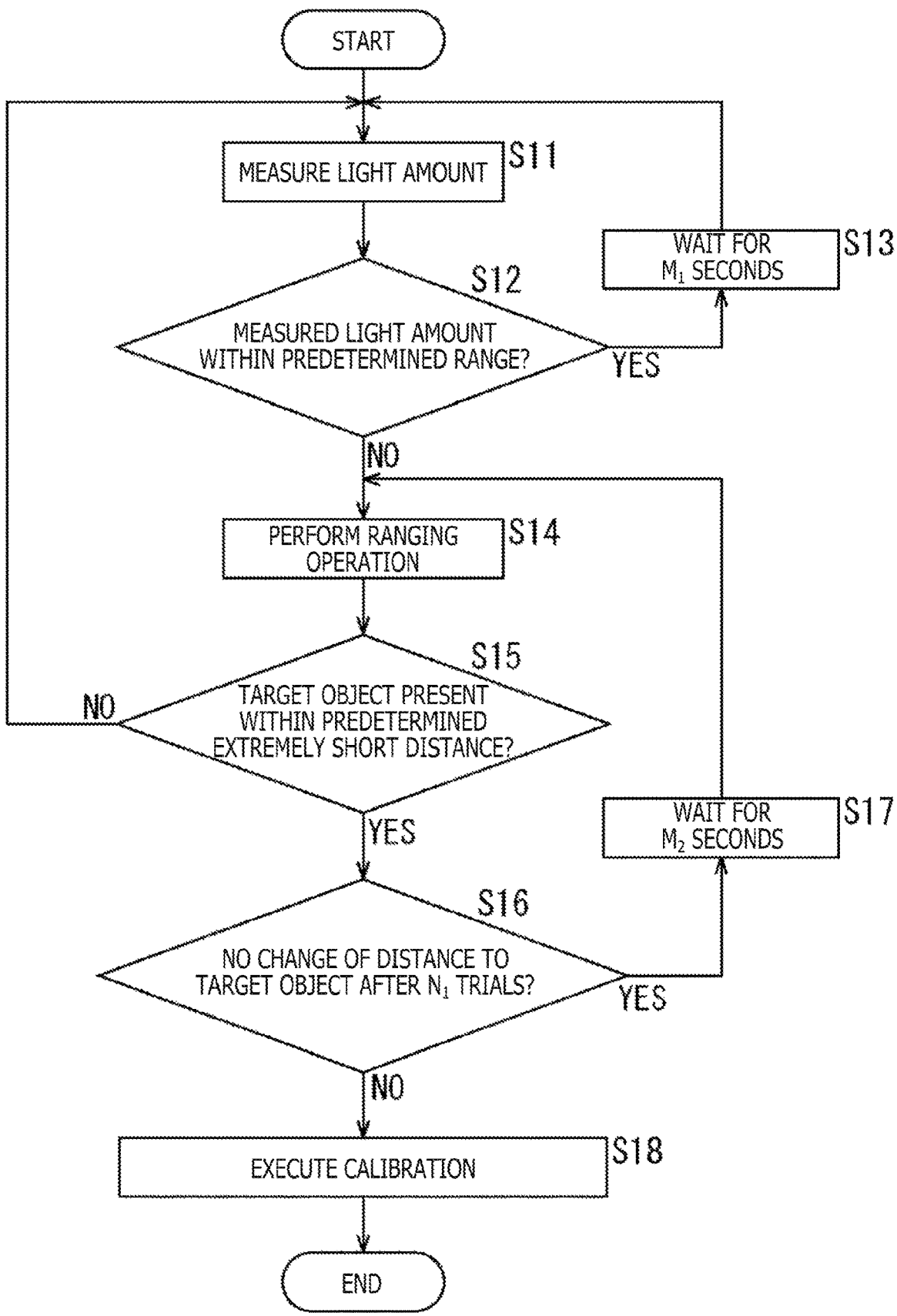
FIG. 9 is a flowchart explaining a flow of a first example of a calibration process performed by the electronic apparatus which includes the ranging apparatus to which the technology according to the present disclosure is applied.

After completion of processing in step S18, the process presented in FIG. 9 ends.

According to the first embodiment described above, in a case where the electronic apparatus 100 including the ranging apparatus 10 (the ranging unit 103) is carried by the user, calibration is performed by using a reflection object which is the target object 20 present on the side of the ranging apparatus 10 (the ranging unit 103) when the electronic apparatus 100 is placed on a desk, or put into a bag, a case, or a pocket of clothes, for example.

Specifically, according to the first embodiment, in a case where the first surface on the side where the light source unit 12 and the sensor unit 13 are provided is in contact with the second surface included in a given target object 20 (e.g., the desk 210) and having unknown reflectance, the determination unit 21 of the control unit 11 or the control unit 101 determines that the second face is usable as a reflection object. In this case, the generation unit 31 of the calibration unit 22 generates a correction table using the second surface of the target object 20 (e.g., the surface of the desk 210) as a reflection object.

In this manner, calibration can be performed without using a dedicated device or the like in the first embodiment. Accordingly, calibration is easily achievable without the necessity of a physical cost.

Moreover, according to the first embodiment, calibration can be performed without awareness by the user on such an occasion when the user places the electronic apparatus 100 on a desk, or puts the electronic apparatus 100 into a bag, a case, or a pocket of clothes, for example, during use of the ranging apparatus 10 after shipment. For example, it is preferable that a correction table is generated considering an environment where the electronic apparatus 100 is used (e.g., temperature), and time (e.g., a use period such as one year and three years). However, the correction table is allowed to be generated (updated) during use after shipment. Accordingly, measured values (offset values of the measured values) can be more accurately corrected by retaining a more ideal correction table.

2. Second Embodiment (Example of Calibration)

Figure 10:
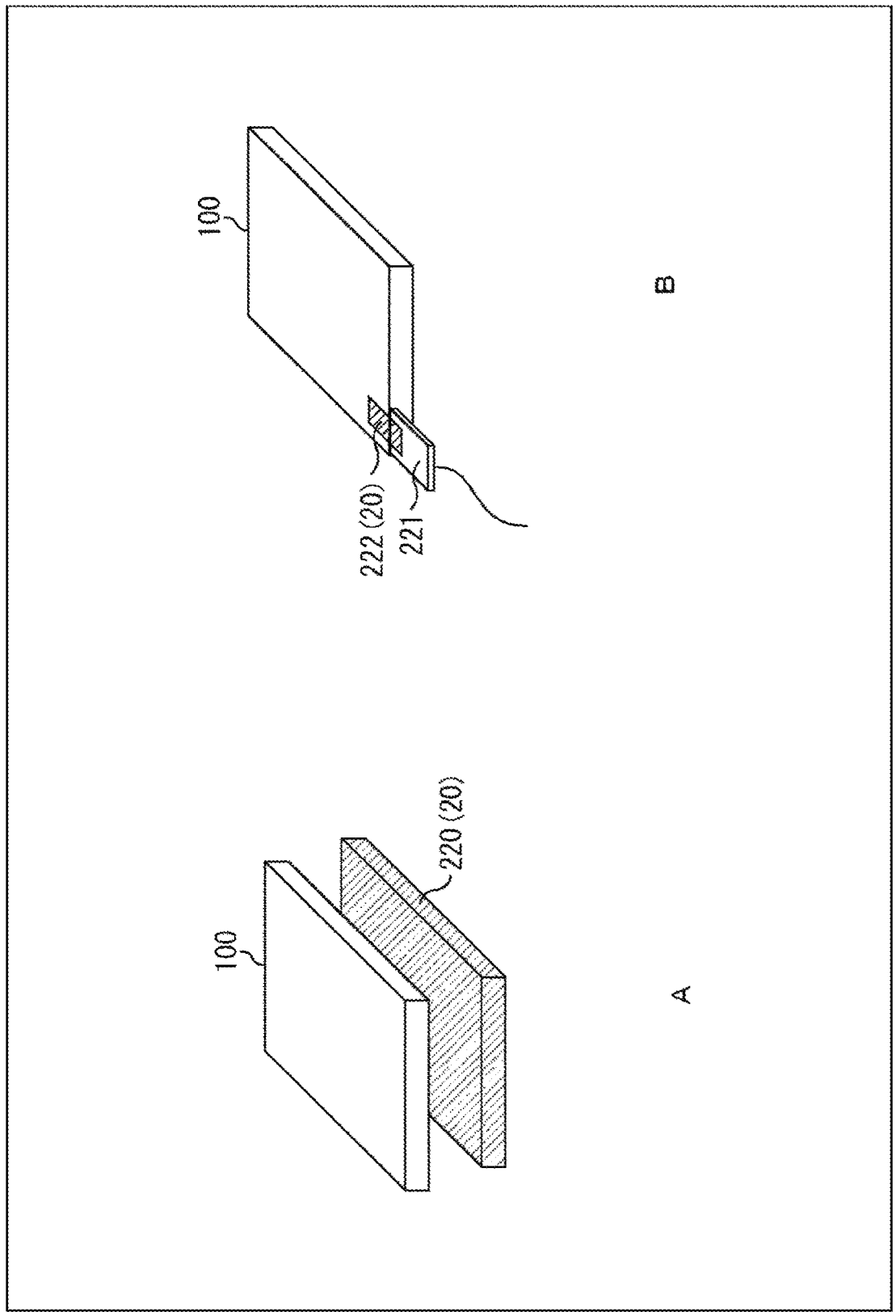
FIG. 10 is a diagram depicting a second example of calibration performed by the electronic apparatus which includes the ranging apparatus to which the technology according to the present disclosure is applied.

FIG. 10 depicts a second example of calibration performed by the electronic apparatus including the ranging apparatus to which the technology according to the present disclosure is applied.

For example, calibration in A of FIG. 10 is performed by using, as a reflection object (reflector), a surface of a charging stand 220 (a surface on the side in contact with the electronic apparatus 100) which is a dedicated charging stand and corresponds to the target object 20 in a case where the electronic apparatus 100 (e.g., a portable terminal) including the ranging apparatus 10 (ranging unit 103) is placed on the charging stand 220 by the user for a charging purpose.

The surface of the charging stand 220 used as the reflection object herein has reflectance known beforehand. In addition, the charging stand 220 is physically disposed at such a position where light emitted from the light source unit 12 can reflect on the surface having this reflectance toward the sensor unit 13 when the electronic apparatus 100 is placed during charge (A of FIG. 10).

Note that a power supply system adopted in a case of use of the charging stand 220 may be a system which supplies power to the electronic apparatus 100 (the power source unit 111 of the electronic apparatus 100) via a connector or a metal contact, or may be a system which uses wireless power supply.

Moreover, calibration in B of FIG. 10 is performed using a surface of a member 222 corresponding to the target object 20 as a reflection object (reflector) in a case where a charging connector 221, which is a dedicated charging connector, is inserted into and connected to the connection unit 110 of the electronic apparatus 100 (e.g., a portable terminal) including the ranging apparatus 10 (the ranging unit 103).

The member 222 herein is attached to a predetermined position of the charging connector 221, and has reflectance known beforehand. In addition, the charging connector 221 is physically disposed at such a position where light emitted from the light source unit 12 can reflect on the surface of the member 222 having this reflectance toward the sensor unit 13 when the charging connector 221 is connected to the connection unit 110 of the electronic apparatus 100 during charge (B of FIG. 10).

Note that the charging connector 221 is a terminal suited for a predetermined system such as USB (Universal Serial Bus), for example, and is connected to a charger via a cable.

In this manner, calibration in the second example is achievable not by using a dedicated device or the like, but only by using the charging stand 220 without change, or simply attaching the member 222 to the charging connector 221. Accordingly, calibration is easily achievable without the necessity of a physical cost. Moreover, calibration in the second example is achievable without awareness by the user when the user places the electronic apparatus 100 on the charging stand 220 or inserts the charging connector 221 for a purpose of charge.

(Flow of Processing)

Described next will be a flow of a second example of the calibration process executed under control by the control unit 11 or the control unit 101 with reference to a flowchart in FIG. 11.

In step S21, the determination unit 21 determines whether or not the electronic apparatus 100 has been connected to the dedicated charging stand 220 or the dedicated charging connector 221 on the basis of a notice signal received from the control unit 101. It is assumed herein that a signal indicating a connection is given for a notice from the control unit 101 to the ranging unit 103 when the connection unit 110 is connected to a connector or a metal contact of the charging stand 220, or connected to the charging connector 221 or the like, for example.

In a case of determination in step S21 that no connection to the charging stand 220 or the like has been made, the process proceeds to step S22. In step S22, the control unit 11 (or the control unit 101) waits for $M_3$ seconds.

After an elapse of $M_3$ seconds, the process subsequently returns to step S21. In this step, the determination process in step S21 is performed to again determine whether or not connection has been made to the charging stand 220 or the like. Thereafter, in a case of determination that a connection to the charging stand 220 or the like has been made after repeating processing in steps S21 and S22, the process proceeds to step S23.

In step S23, the calibration unit 22 executes calibration by using, as a reflection object, the target object 20 as a target of determination (e.g., the surface of the charging stand 220 or the surface of the member 222 of the charging connector 221).

For example, in this calibration, reflection light from the target object 20 (e.g., the surface of the charging stand 220 or the surface of the member 222 of the charging connector 221) is detected using the sensor unit 13 while changing emission timing of light (rectangular pulse light) from the light source unit 12, and a correction table (e.g., C in FIG. 4) based on a detection result thus obtained is generated using the generation unit 31.

Figure 11:
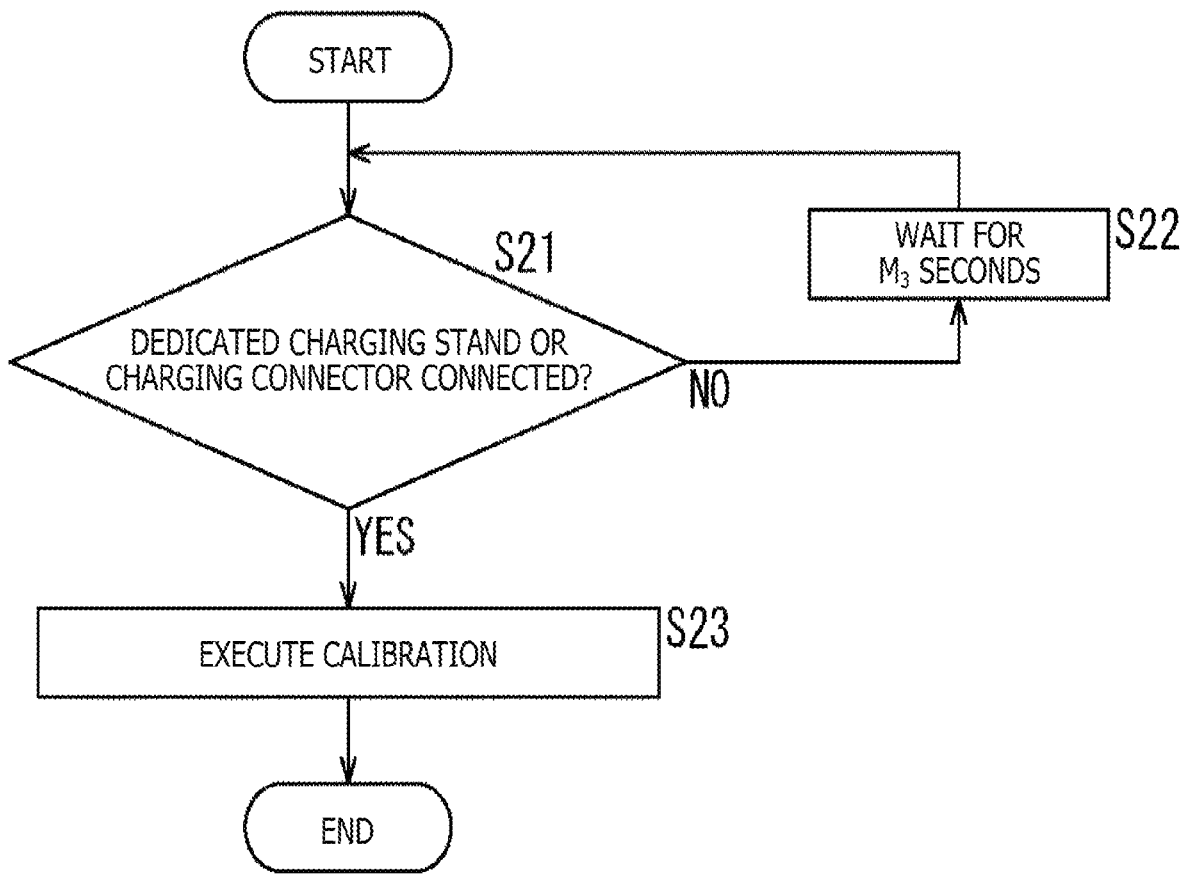
FIG. 11 is a flowchart explaining a flow of a second example of the calibration process performed by the electronic apparatus which includes the ranging apparatus to which the technology according to the present disclosure is applied.

After completion of processing in step S23, the process presented in FIG. 11 ends.

According to the second embodiment described above, the electronic apparatus 100 including the ranging apparatus 10 (the ranging unit 103) performs calibration using a reflection object which is the target object 20 corresponding to the charging stand 220 or the member 222 of the charging connector 221 when the user places the electronic apparatus 100 on the charging stand 220 or inserts the charging connector 221, for example, for a purpose of charge.

Specifically, according to the second embodiment, in a case where the first surface on the side where the light source unit 12 and the sensor unit 13 are provided is in contact with or adjacent to the second surface included in the particular target object 20 (e.g., the charging stand 220 or the member 222 of the charging connector 221) having known reflectance, the determination unit 21 of the control unit 11 or the control unit 101 determines that the second surface is usable as a reflection object. In this case, the generation unit 31 of the calibration unit 22 generates a correction table using the second surface of the target object 20 (e.g., the surface of the charging stand 220 or the surface of the member 222 of the charging connector 221) as a reflection object.

In this manner, calibration in the second embodiment can be performed without using a dedicated device or the like. Accordingly, calibration is easily achievable without the necessity of a physical cost. Moreover, in the second embodiment, calibration is achievable without awareness by the user when the user places the electronic apparatus 100 on the charging stand 220 or inserts the charging connector 221, for example, for a purpose of charge during use of the ranging apparatus 10 after shipment.

Note that the reflectance is difficult to know beforehand in the state where the desk 210 or the like where the electronic apparatus 100 is accidentally placed is used as the target object 20 corresponding to a reflection object in the first embodiment described above. However, in a case where the charging stand 220 or the member 222 of the charging connector 221 is the target object 20 used as a reflection object as in the second embodiment, reflectance of the reflection object can be recognized beforehand. Accordingly, it is possible to increase accuracy of the correction table to be generated.

3. Third Embodiment (Example of Calibration)

Figure 12:
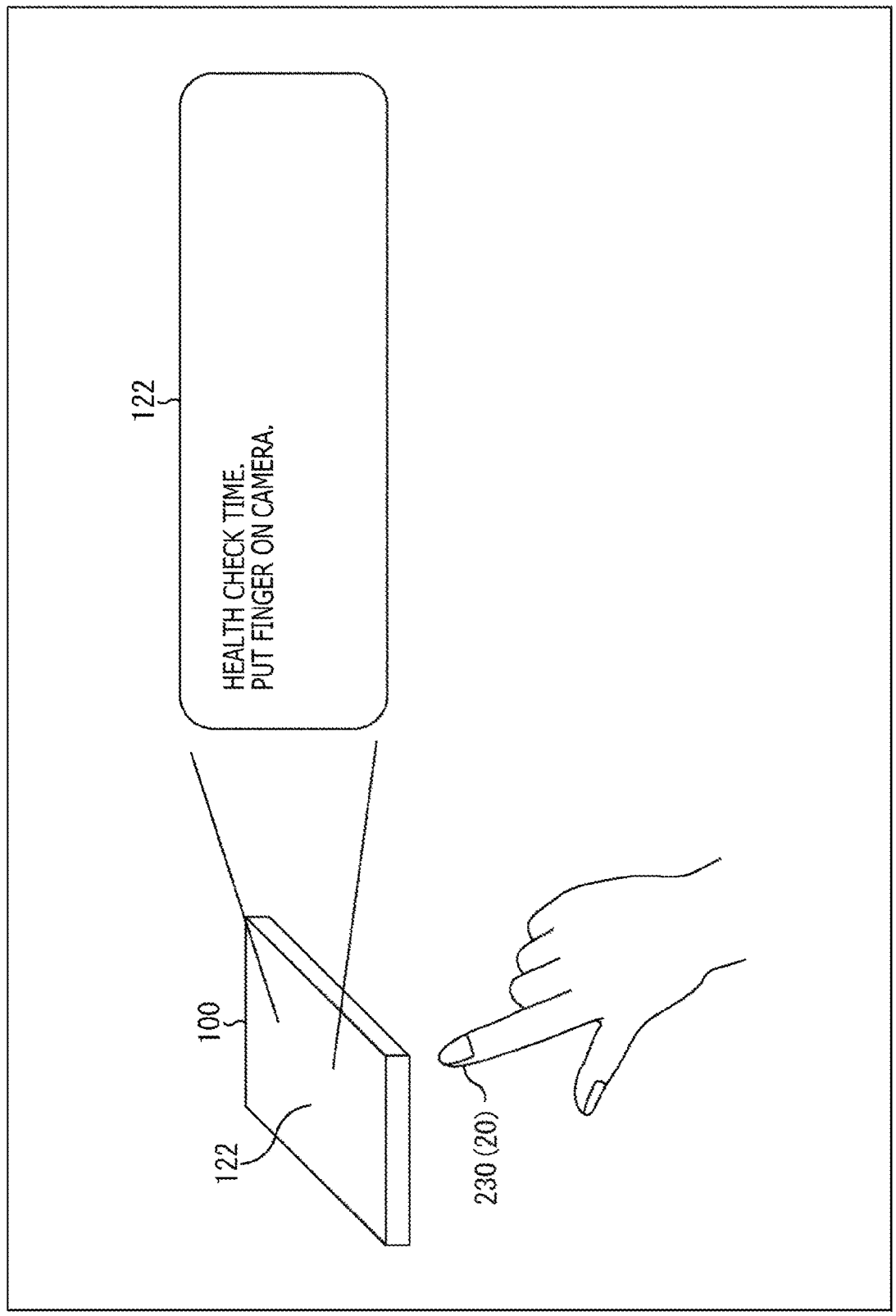
FIG. 12 is a diagram depicting a third example of calibration performed by the electronic apparatus which includes the ranging apparatus to which the technology according to the present disclosure is applied.

FIG. 12 depicts a third example of calibration performed by the electronic apparatus including the ranging apparatus to which the technology according to the present disclosure is applied.

Calibration performed by the electronic apparatus 100 (e.g., a portable terminal) including the ranging apparatus 10 (the ranging unit 103) may be helped (assisted) by the user carrying the electronic apparatus 100.

Calibration in FIG. 12 is performed using a finger 230 of the user (e.g., a skin surface of a forefinger of the user in contact with a lens of the ranging unit 103) as the target object 20 corresponding to a reflection object at the time of use of an application for measuring pulses of the finger of the user put on the ranging unit 103 of the electronic apparatus 100, for example.

Specifically, calibration is performed on such an occasion when the user measures biological information such as pulses and blood oxygen concentrations using the application for health management. It is assumed herein that reflectance of the skin surface of the finger is approximately fixed even with variances for each person.

In FIG. 12, a message for urging measurement of biological information for health management is displayed on the display unit 122 under the application at a predetermined time. However, such a message is not required to be displayed using a timer as depicted in the figure. For example, this message may be displayed on an occasion of a need for calibration in response to a temperature change or the like, and calibration may be performed along with measurement of biological information. Moreover, measurement of biological information may be urged not only by display of a message, but also by emission of sound, vibration, lighting of an LED, or others, for example.

In this manner, calibration in the third example can be easily performed without using a dedicated device or the like and without the necessity of a physical cost. Moreover, calibration in the third example can be performed without awareness by the user on such an occasion when the user measures biological information for a purpose of health management. Furthermore, the ranging unit 103 may be closed by the finger in response to a message of notice given according to a temperature change or the like, for example. Accordingly, calibration is achievable at necessary timing.

(Flow of Processing)

Figure 13:
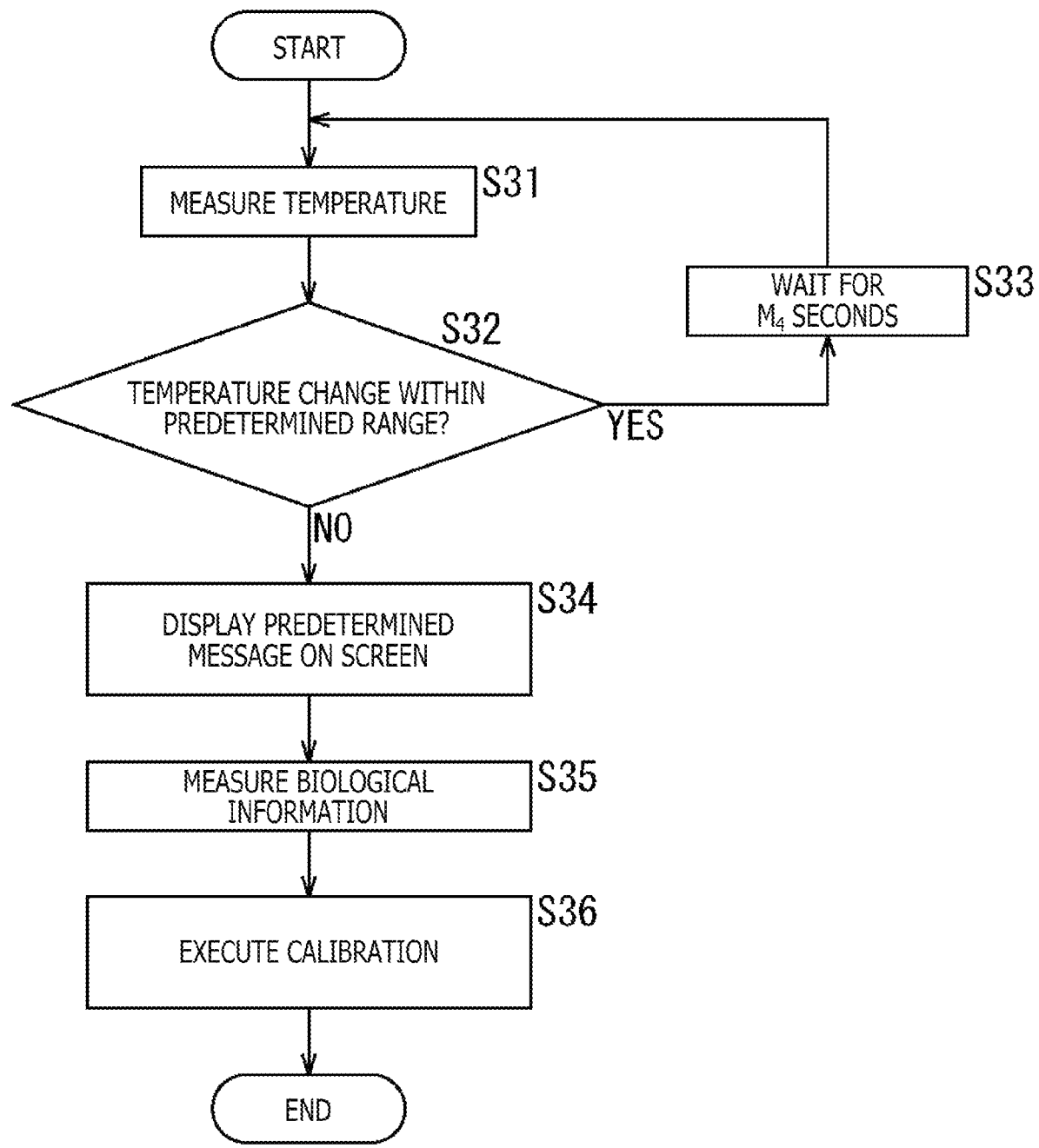
FIG. 13 is a flowchart explaining a flow of a third example of the calibration process performed by the electronic apparatus which includes the ranging apparatus to which the technology according to the present disclosure is applied.

Described next will be a flow of a third example of the calibration process executed under control by the control unit 11 or the control unit 101 with reference to a flowchart in FIG. 13.

In step S31, the control unit 101 measures a temperature. For example, a method for measuring the temperature may be a method which measures a temperature using a temperature sensor provided as the sensor 105 of the electronic apparatus 100.

In step S32, the determination unit 21 determines whether or not a temperature change falls within a predetermined range on the basis of a result of the temperature measurement.

For example, it may be determined herein that calibration is necessary in a case of determination that a change of a measured temperature is a predetermined threshold or larger on the basis of a comparison between the temperature measured (measured temperature) and the predetermined threshold. Specifically, a temperature change may affect an offset of the ranging apparatus 10. Accordingly, a change of the measured temperature is determined using a threshold herein. Note that a remaining amount of the battery or the like may be detected herein as another status change affecting the offset of the ranging apparatus 10, for example.

In a case of determination in step S32 that the temperature change falls within a predetermined range, i.e., that calibration is unnecessary, the process proceeds to step S33. In step S33, the control unit 11 (or the control unit 101) waits for $M_4$ seconds.

After an elapse of $M_4$ seconds, the process subsequently returns to step S31. Thereafter, processing in steps S31 and S32 is performed to again determine whether or not the temperature change is out of the predetermined range. In a case of determination that the temperature change is out of a predetermined range, i.e., that calibration is necessary after repeating processing from steps S31 to S33, the process proceeds to step S34.

By repeating the temperature measurement and the determination process for the measurement in the manner described above, the user can be urged to measure biological information at the time when calibration for a temperature change or the like is required, for example.

In step S34, the control unit 101 displays a predetermined message for urging measurement of biological information on the display unit 122. In response to this display, the user applies a finger to a portion where the ranging unit 103 (the lens of the ranging unit 103) is provided in a housing of the electronic apparatus 100 (e.g., a portable terminal) to close this portion.

In step S35, the control unit 101 measures biological information such as pulses and blood oxygen concentrations on the basis of data received from the ranging unit 103.

In step S36, the calibration unit 22 executes calibration using the target object 20 (e.g., the skin surface of the finger 230 of the user) as a reflection object.

For example, in this calibration, the sensor unit 13 detects reflection light from the target object 20 (e.g., the skin surface of the finger 230 of the user) while changing emission timing of light (rectangular pulse light) from the light source unit 12, and the generation unit 31 generates a correction table (e.g., C in FIG. 4) based on a detection result thus obtained.

Note that the electronic apparatus 100 simultaneously (in a parallel manner) executes the process for measuring biological information (S35) and the calibration (S36).

According to the third embodiment described above, calibration performed by the electronic apparatus 100 including the ranging apparatus 10 (the ranging unit 103) is assisted by the user carrying the electronic apparatus 100.

Specifically, according to the third embodiment, in a case where a part of the body of the user (e.g., the finger 230 of the user) as the target object 20 is in contact with or adjacent to a position near the light source unit 12 and the sensor unit 13, the determination unit 21 of the control unit 11 or the control unit 101 determines that the part of the body of the user is usable as the reflection object. In this case, the generation unit 31 of the calibration unit 22 generates a correction table using the part of the body of the user (e.g., the skin surface of the finger 230 of the user) as a reflection object.

In this manner, calibration in the third embodiment can be performed without using a dedicated device or the like. Accordingly, calibration is easily achievable without the necessity of a physical cost.

Moreover, calibration in the third embodiment is achievable without awareness by the user on such an occasion when the user measures biological information for a purpose of health management during use of the ranging apparatus 10 after shipment. Furthermore, according to the third embodiment, the ranging unit 103 may be closed by the finger in response to a message of notice given according to a temperature change, a remaining amount of the battery, or the like, for example. Accordingly, calibration is achievable at necessary timing.

Note that the electronic apparatus 100 is assumed to measure biological information (e.g., pulses) when the finger of the user is put on the camera 104 or the sensor 105 in addition to the ranging unit 103. In this case, calibration in the manner described above can be performed by physically disposing the ranging unit 103 at such a position where light from the light source unit 12 can reflect on the skin surface of the finger toward the sensor unit 13 when the user puts the finger on the camera 104 or the sensor 105.

Moreover, while the application for measuring biological information for the purpose of health management has been described above, the application associated with biological information concerning the user is presented only way of example. The user may be urged to put the finger on the portion where the ranging unit 103 (the lens of the ranging unit 103) and close the portion under another application. Alternatively, an application for calibration may be provided.

4. Fourth Embodiment (Example of Calibration)

Figure 14:
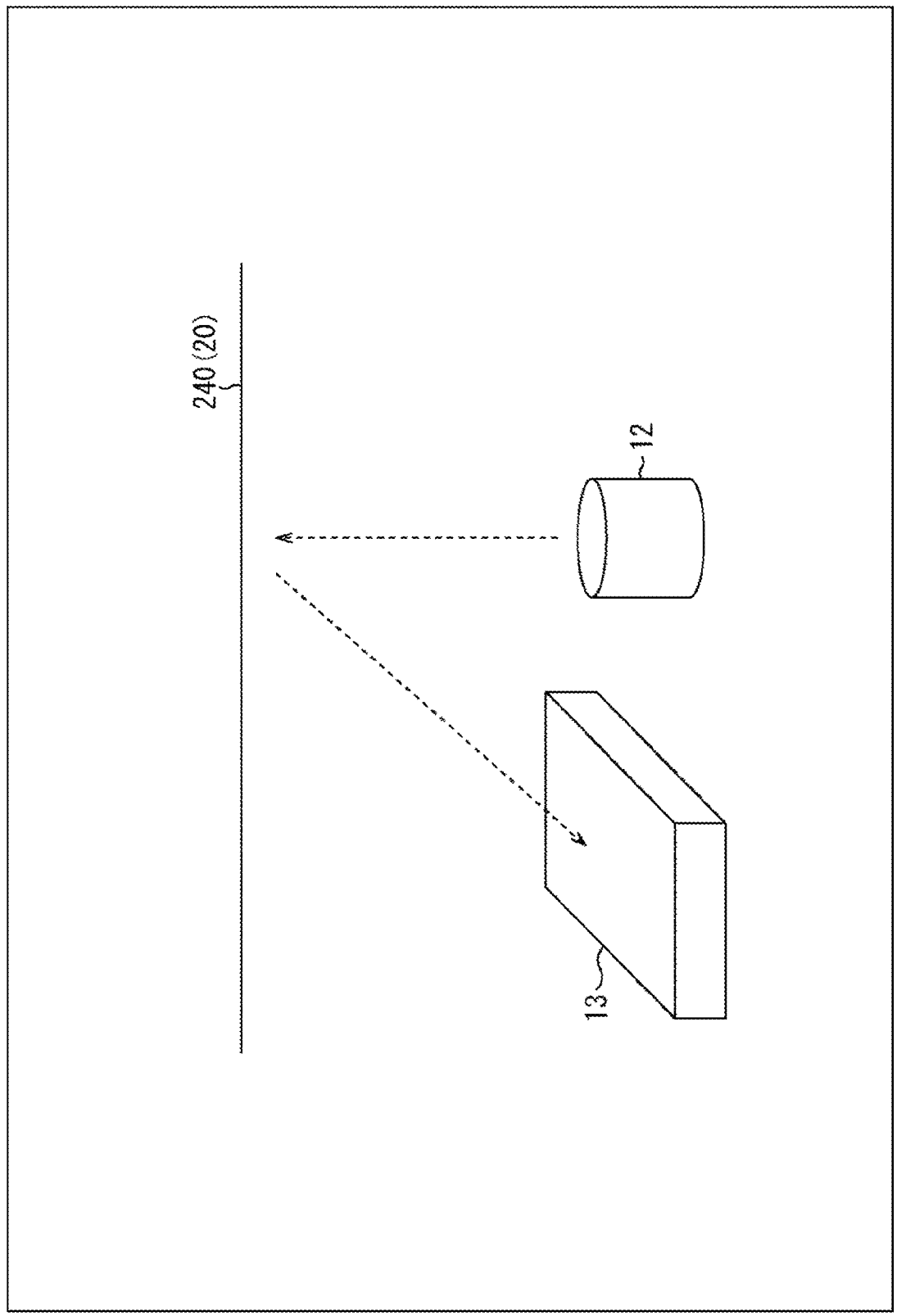
FIG. 14 is a diagram depicting a fourth example of calibration performed by the electronic apparatus which includes the ranging apparatus to which the technology according to the present disclosure is applied.

FIG. 14 depicts a fourth example of calibration performed by the electronic apparatus which includes the ranging apparatus to which the technology according to the present disclosure is applied.

Calibration in FIG. 14 is performed using a surface of a ceiling 240 corresponding to the target object 20 as a reflection object (reflector) when the electronic apparatus 100 (e.g., a portable terminal) including the ranging apparatus 10 (the ranging unit 103) is placed on a desk, for example. In other words, the ceiling 240 is considered herein as a screen having substantially fixed reflectance (the target object 20 having a uniform surface).

Note that the surface of the ceiling 240 (the target object 20 having a uniform surface) present above the light source unit 12 and the sensor unit 13 is used as a reflection object in a state (hereinafter also referred to as a second state) where the ranging unit 103 (the light source unit 12 and the sensor unit 13 of the ranging unit 103) is provided on the front surface side or the rear surface side of the housing of the electronic apparatus 100 and simultaneously in a state where the surface opposite to the surface on the side where the ranging unit 103 is provided is turned face down. Moreover, light emitted from the light source unit 12 of the ranging unit 103 at this time is required to reach the ceiling 240 located approximately two meters ahead, for example.

In this manner, calibration can be easily performed without using a dedicated device or the like and without the necessity of a physical cost in the fourth example.

(Flow of Processing)

Described next will be a flow of a fourth example of the calibration process executed under control by the control unit 11 or the control unit 101 with reference to a flowchart in FIG. 15.

In step S41, the control unit 11 (or the control unit 101) controls the light source unit 12 and the sensor unit 13 to perform a ranging operation.

In step S42, the determination unit 21 determines whether or not the target object 20 having a uniform surface is present within a predetermined distance on the basis of range information obtained by the ranging operation. Light is applied from the light source unit 12 herein to detect a surface of the target object 20 (e.g., the ceiling 240) having a uniform surface and usable as a reflection object within approximately two to three meters, for example.

In a case of determination in step S42 that the target object 20 is absent within the predetermined distance, the process returns to step S41 to repeat processing in steps S41 and S42.

On the other hand, in a case of determination in step S42 that the target object 20 is present within the predetermined distance, the process proceeds to step S43. In step S43, the determination unit 21 determines whether or not the distance to the target object 20 changes after $N_2$ trials of the ranging operation.

In a case of determination in step S43 that the distance to the target object 20 has changed after $N_2$ trials, the process proceeds to step S44. In step S44, the control unit 11 (or the control unit 101) waits for $M_5$ seconds.

After an elapse of $M_5$ seconds, the process subsequently returns to step S41 to repeat processing in step S41 and after step S41. Specifically, in a case where the distance to the target object 20 has changed after $N_2$ trials of the ranging operation, there is a possibility that erroneous detection or the like has been made. In this case, the target object 20 is difficult to use as the reflection object. Accordingly, a new ranging operation is again performed to start over the detection of the target object 20.

On the other hand, in a case of determination in step S43 that the distance to the target object 20 does not change even after $N_2$ trials, the process proceeds to step S45. In step S45, the calibration unit 22 executes calibration using the target object 20 as a target of determination (e.g., the ceiling 240) as a reflection object.

For example, in this calibration, the sensor unit 13 detects reflection light from the target object 20 (e.g., the surface of the ceiling 240) while changing emission timing of light (rectangular pulse light) from the light source unit 12, and the generation unit 31 generates a correction table (e.g., C in FIG. 4) based on a detection result thus obtained.

Figure 15:
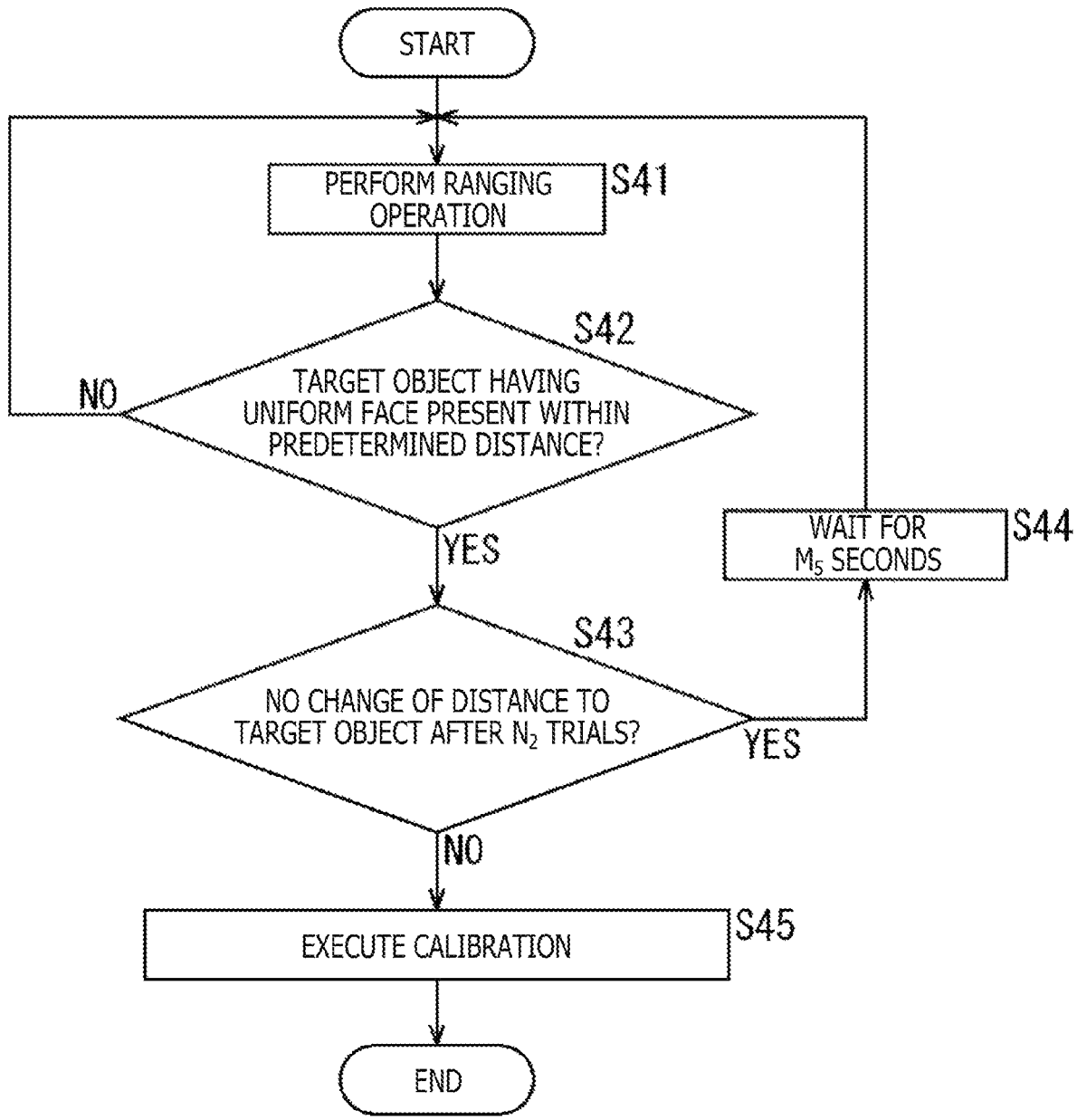
FIG. 15 is a flowchart explaining a flow of a fourth example of the calibration process performed by the electronic apparatus which includes the ranging apparatus to which the technology according to the present disclosure is applied.

After completion of processing in step S45, the process presented in FIG. 15 ends.

According to the fourth embodiment described above, in a case where the electronic apparatus 100 including the ranging apparatus 10 (the ranging unit 103) is carried by the user, calibration is performed by using a reflection object which is the target object 20 present above the ranging apparatus 10 (the ranging unit 103) when the electronic apparatus 100 is placed on a desk, for example.

Specifically, according to the fourth embodiment, in a case where a third surface opposite to the first surface where the light source unit 12 and the sensor unit 13 are provided is in contact with a fourth surface included in the object (e.g., a desk) in a state where the electronic apparatus 100 is placed on a given object (e.g., a desk), and also in a state where light from the light source unit 12 is applicable to the second surface included in a given target object 20 (e.g., the ceiling 240), the determination unit 21 of the control unit 11 or the control unit 101 determines that the second surface included in the target object 20 and having unknown reflectance is usable as a reflection object. In this case, the generation unit 31 of the calibration unit 22 generates a correction table using the second surface of the target object 20 (e.g., the face of the ceiling 240) as a reflection object.

In this manner, calibration in the fourth embodiment can be performed without using a dedicated device or the like. Accordingly, calibration is easily achievable without the necessity of a physical cost. Moreover, according to the fourth embodiment, calibration can be achieved without awareness by the user on such an occasion when the electronic apparatus 100 is placed on a desk during use of the ranging apparatus 10 after shipment, for example.

5. Fifth Embodiment (Example of Calibration)

Figure 16:
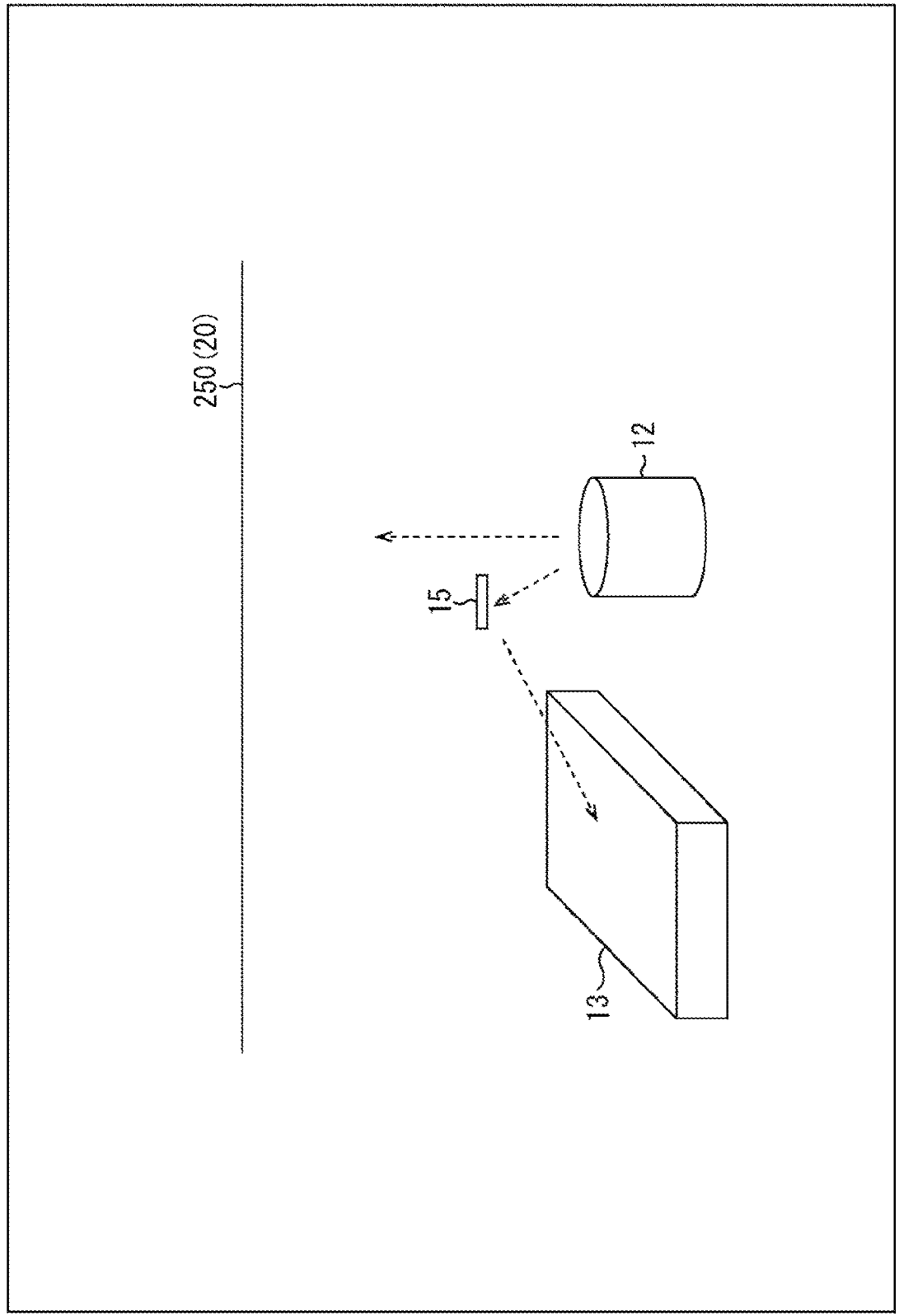
FIG. 16 is a diagram depicting a fifth example of calibration performed by the electronic apparatus which includes the ranging apparatus to which the technology according to the present disclosure is applied.

FIG. 16 depicts a fifth example of calibration performed by the electronic apparatus which includes the ranging apparatus to which the technology according to the present disclosure is applied.

In FIG. 16, in a case where the electronic apparatus 100 (e.g., a portable terminal) including the ranging apparatus 10 (the ranging unit 103) is placed on a desk and detects a ceiling 250, for example, calibration is performed according to this status using a small reflector 15 provided within the ranging unit 103 and corresponding to the target object 20 rather than the ceiling 250. The small reflector 15 herein is an example of a reflection member structured to allow light (slight light) from the light source unit 12 to reflect toward a light receiving surface of the sensor unit 13.

Note that the ranging unit 103 (the light source unit 12 and the sensor unit 13 of the ranging unit 103) in the fifth example is provided on the front surface side or the rear surface side of the housing of the electronic apparatus 100 such as a smartphone to produce a second state (a state opposite to the first state) similarly to the fourth example described above.

In this case, the ceiling 250 which is a screen having substantially fixed reflectance is present at a position two to three meters ahead of the electronic apparatus 100. In this case, for example, the ranging unit 103 performs calibration by reducing power to such a level where light emitted from the light source unit 12 does not reach the ceiling 250, and utilizing light reflected on the small reflector 15 when the ceiling 250 is detected in a state where slight reflection light constantly enters the ranging unit 103 and is detected by the sensor unit 13. Note that an amount of light that does not reach the ceiling 250 can be calculated by SNR (Signal Noise Ratio) or the like, for example.

Note that calibration is performed via the small reflector 15 by controlling the light emitted from the light source unit 12 (e.g., applying light more intense than background light) when absence of the target object 20 within the ranging range of the ranging unit 103 is detected in such a case where the electronic apparatus 100 is used in an open outdoor place (e.g., outdoor communication by telephone using a smartphone), for example.

As described above, while the ranging unit 103 is required to include the small reflector 15, calibration in the fifth example can be performed without using a dedicated device or the like. Accordingly, calibration is easily achievable without the necessity of a physical cost. Moreover, in a case where the electronic apparatus 100 is used indoor or like places in the fifth example, power of the light source unit 12 is reduced at the time of detection of the ceiling 250. Accordingly, calibration is achievable if only a certain level of light source power is provided.

(Flow of Processing)

Described next will be a flow of a fifth example of the calibration process executed under control by the control unit 11 or the control unit 101 with reference to a flowchart in FIG. 17.

In step S51, the control unit 11 (or the control unit 101) controls the light source unit 12 and the sensor unit 13 to perform a ranging operation.

In step S52, the determination unit 21 determines whether or not reflection light has been received on the basis of a detection result obtained by the sensor unit 13.

In a case of determination in step S52 that the reflection light has not been received, the process proceeds to step S53. In step S53, the control unit 11 sets such a light amount for the light source unit 12 that the small reflector 15 can receive a sufficient light amount.

In step S54, the calibration unit 22 executes calibration using the small reflector 15 corresponding to the target object 20. In this manner, the generation unit 31 generates a correction table corresponding to a light amount adaptably controlled (e.g., C in FIG. 4). In this case, the small reflector 15 obtains a sufficient light amount. Accordingly, accuracy of the generated correction table can be improved.

On the other hand, in a case of determination in step S52 that the reflection light has been received, the process proceeds to step S55. In step S55, the determination unit 21 determines whether or not the target object 20 having a uniform surface is present within a predetermined distance (e.g., the ceiling 250 located two to three meters ahead) on the basis of range information obtained by the ranging operation.

In a case of determination in step S55 that the target object 20 is absent within the predetermined distance, the process proceeds to step S56. In step S56, the control unit 11 (or the control unit 101) waits for $M_6$ seconds. After an elapse of $M_6$ seconds, the process subsequently returns to step S51 to repeat processing in step S51 and after step S51.

In a case of determination in step S55 that the target object 20 is present within the predetermined distance, the process proceeds to step S57. In step S57, the determination unit 21 determines whether or not such a light amount that the light does not reach the uniform target object 20 (e.g., the ceiling 250 located two to three meters ahead) and that the small reflector 15 can receive a sufficient light amount can be set for the light source unit 12.

In a case of affirmation in the determination process in step S57 ("YES" in S57), the process proceeds to step S58. In step S58, the control unit 11 reduces the light amount of the light source unit 12. By this reduction of the light amount of the light source unit 12 herein, such a light amount that the light does not reach the uniform target object 20 (e.g., the ceiling 250 located two to three meters ahead) and that the small reflector 15 can receive a sufficient light amount is set.

In step S59, the calibration unit 22 executes calibration using the small reflector 15 corresponding to the target object 20. On the basis of this calibration, the generation unit 31 generates a correction table corresponding to a light amount adaptably controlled (e.g., C in FIG. 4).

On the other hand, in a case of negation in the determination process in step S57 ("NO" in S57), the process proceeds to step S60. In step S60, the calibration unit 22 executes calibration using a uniform target corresponding to the target object 20 (e.g., the ceiling 250 located two to three meters ahead). On the basis of this calibration, the generation unit 31 generates a correction table (e.g., C in FIG. 4).

Figure 17:
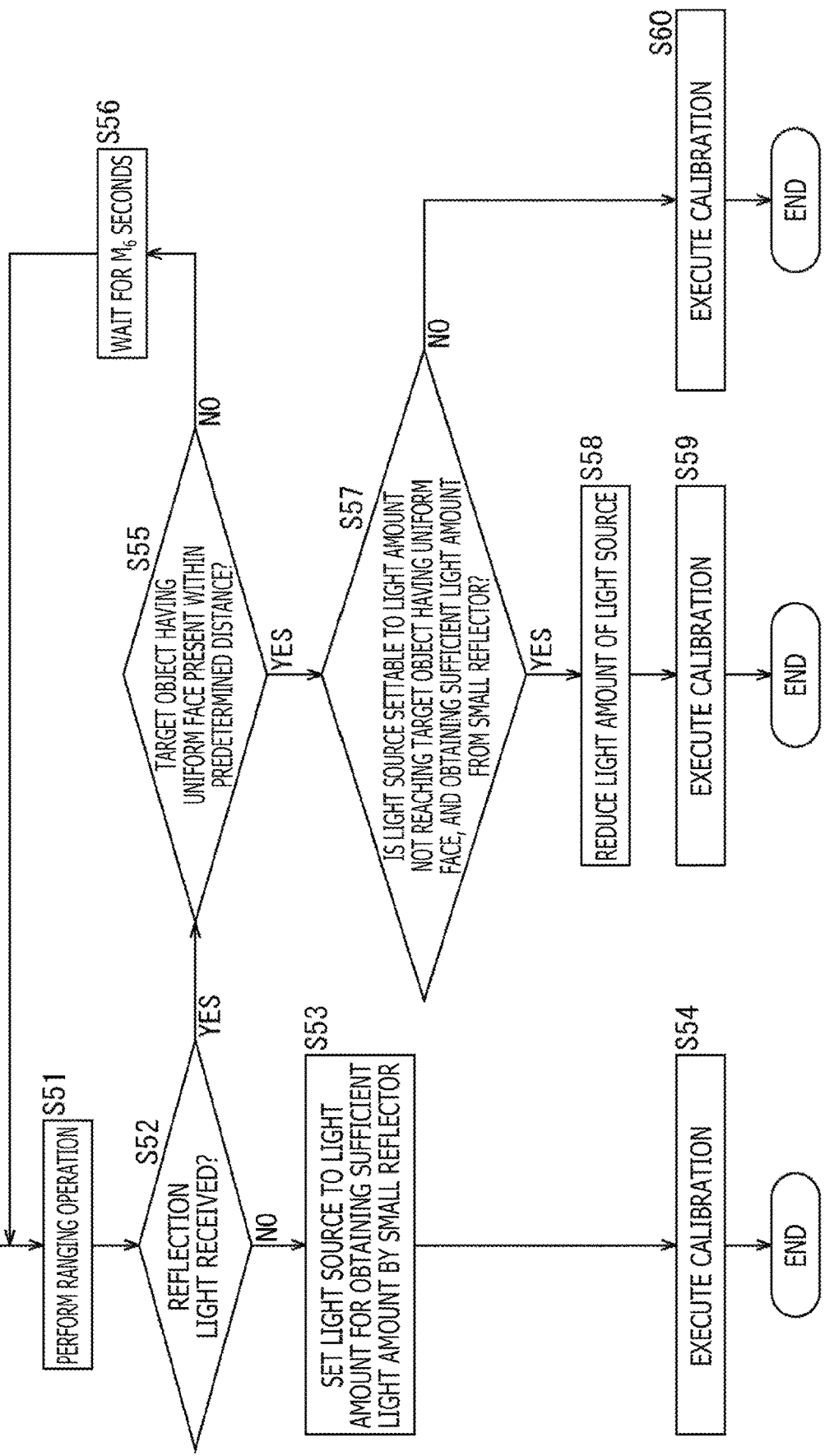
FIG. 17 is a flowchart explaining a flow of a fifth example of the calibration process performed by the electronic apparatus which includes the ranging apparatus to which the technology according to the present disclosure is applied.

After completion of processing in step S54, 59, or 60, the process presented in FIG. 17 ends.

According to the fifth embodiment described above, in a case where the electronic apparatus 100 including the ranging apparatus 10 (the ranging unit 103) is placed on a desk and detects the ceiling 250, for example, calibration is performed according to this status using the small reflector 15 provided within the ranging unit 103 and corresponding to the target object 20 rather than using the ceiling 250.

Specifically, according to the fifth embodiment, in a case where the first surface on the side where the light source unit 12 and the sensor unit 13 are provided faces in a given direction, the determination unit 21 of the control unit 11 or the control unit 101 determines that the small reflector 15 is usable as a reflection object by adaptively controlling the light amount from the light source unit 12. In this case, the generation unit 31 of the calibration unit 22 generates a correction table using the small reflector 15 as a reflection object.

In this manner, calibration in the fifth embodiment can be performed without using a dedicated device or the like. Accordingly, calibration is easily achievable without the necessity of a physical cost. Moreover, according to the fifth embodiment, calibration can be achieved without awareness by the user on such an occasion when the user places the electronic apparatus 100 on a desk during use of the ranging apparatus 10 after shipment, for example.

Furthermore, according to the fifth embodiment, a correction table (e.g., C in FIG. 4) can be generated according to reflection light of light (light having various levels of power) which is emitted from the light source unit 12 generating a light amount adaptively controlled, and is reflected on the small reflector 15 or the ceiling 250 used as a reflection object. Accordingly, a correction table applicable in a wider range can be generated by repeatedly executing the calibration process in FIG. 17 and sequentially storing a plurality of correction tables corresponding to various levels of power.

6. Sixth Embodiment (Configuration Example of Ranging System)

Figure 18:
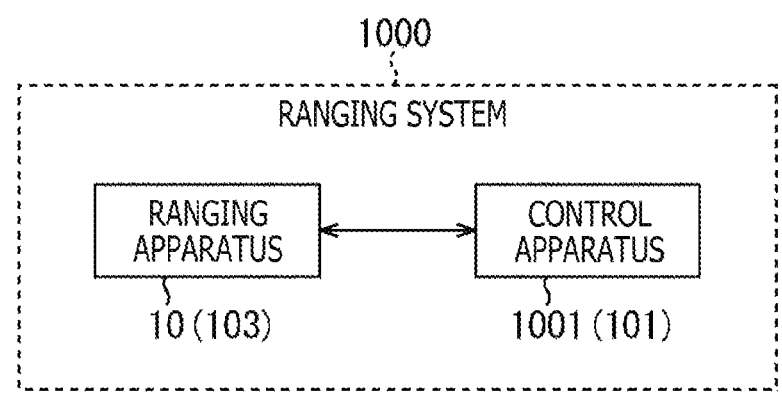
FIG. 18 is a block diagram depicting a configuration example of a ranging system to which the technology according to the present disclosure is applied.

FIG. 18 is a block diagram depicting a configuration example of a ranging system to which the technology according to the present disclosure is applied.

A ranging system 1000 in FIG. 18 includes the ranging apparatus 10 and a control apparatus 1001.

For example, the ranging apparatus 10 is constituted as a ranging module or the like, and has the configuration depicted in FIG. 1. The ranging apparatus 10 performs a ranging operation under control by the control apparatus 1001.

For example, the control apparatus 1001 includes the control unit 101 (FIG. 2) including a CPU, a microprocessor, an FPGA, or the like. Accordingly, the control apparatus 1001 includes the determination unit 21 and the calibration unit 22 depicted in FIG. 3.

The control apparatus 1001 controls the ranging operation performed by the ranging apparatus 10. Moreover, the control apparatus 1001 performs a process associated with calibration for correcting offset values between true values of range values and measured values.

As described above, the electronic apparatus 100 including the ranging apparatus 10 to which the technology according to the present disclosure is applied is considered as the ranging system 1000 including the ranging apparatus 10 and the control apparatus 1001.

Note that the system in the present description refers to a set of a plurality of constituent elements (devices, modules (parts), and others). It does not matter whether or not all the constituent elements are accommodated in an identical housing. Accordingly, a plurality of devices accommodated in separate housings and connected to each other via a network, and one device which includes a plurality of modules accommodated in one housing are both systems.

(Software Configuration Example)

In addition, the process executed by the determination unit 21 and the calibration unit 22 depicted in FIG. 3, i.e., a series of the processes described above (e.g., a calibration process presented in FIGS. 9, 11, 13, 15, and 17) may be executed by either hardware or software. In a case of execution of the series of processes by software, a program constituting the software is installed in the electronic apparatus 100 (FIG. 2), and stored in a storage device such as the memory 106 (FIG. 2), for example.

This program is executed by the control unit 101 (FIG. 2) including a CPU or the like, or by the control apparatus 1001 (FIG. 18) to implement functions associated with calibration and performed by the determination unit 21, the calibration unit 22, and others.

Note that the program executed by the control unit 101 or the control apparatus 1001 may be either a program under which processes are performed in time series in the order described in the present description, or may be a program under which processes are performed in parallel or at necessary timing such as an occasion when a call has been made. Accordingly, processing steps describing the program under which the control unit 101 or the control apparatus 1001 performs various processes are not necessarily required to be practiced in time series in the order presented in the flowcharts described above, but may include processes executed in parallel or individually (e.g., parallel processes or processes performed by objects).

7. Example of Application to Mobile Body

The technology according to the present disclosure (present technology) is applicable to various products. For example, the technology according to the present disclosure may be implemented as a device mounted on a mobile body of any of types such as an automobile, an electric automobile, a hybrid electric automobile, a motorcycle, a bicycle, a personal mobility, an airplane, a drone, a vessel, and a robot.

Figure 19:
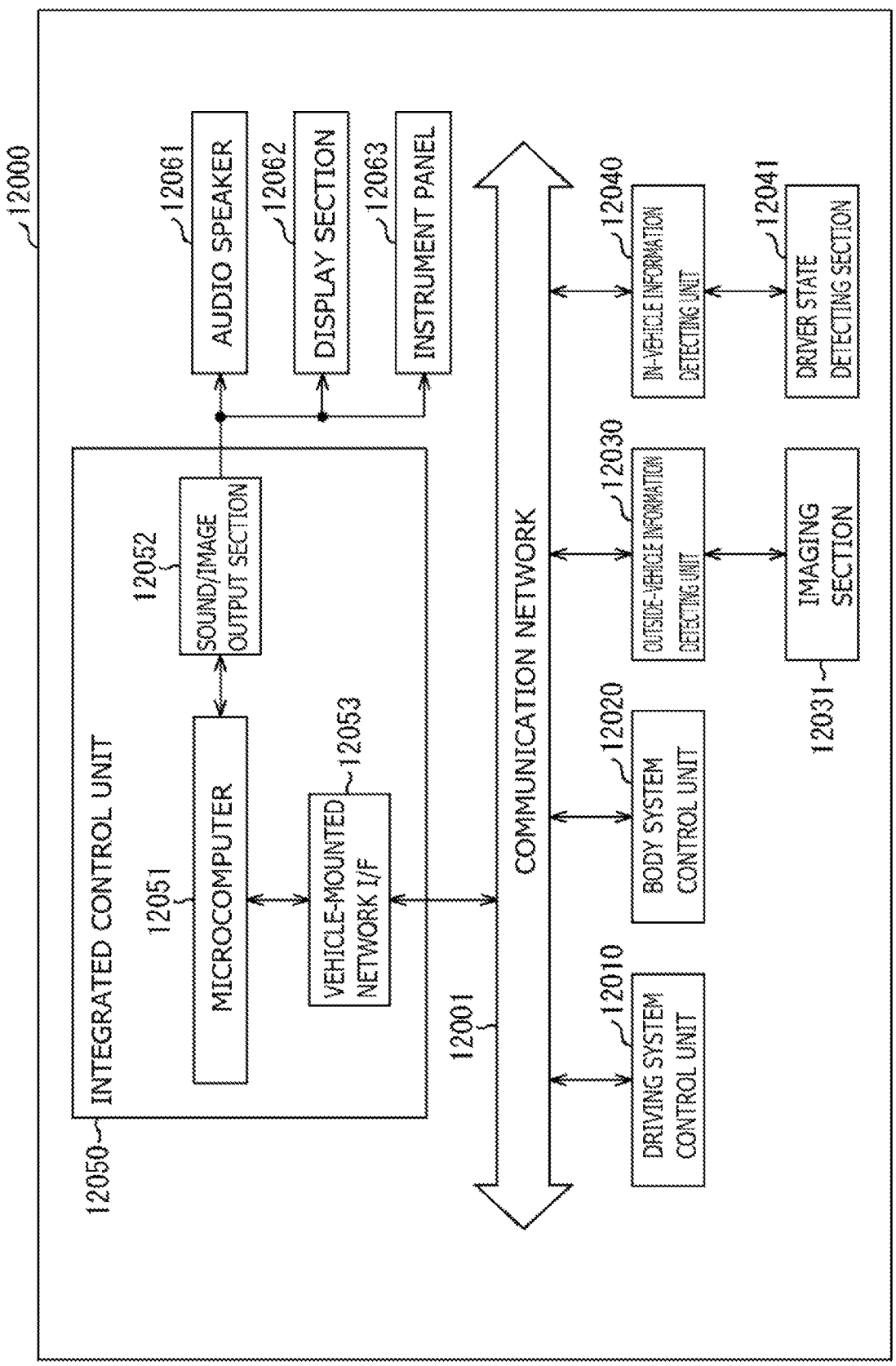
FIG. 19 is a block diagram depicting an example of schematic configuration of a vehicle control system.

FIG. 19 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 19, an audio speaker 12061, a display section 12062, and an instrument panel 12063 are illustrated as the output device. The display section 12062 may, for example, include at least one of an on-board display and a head-up display.

Figure 20:
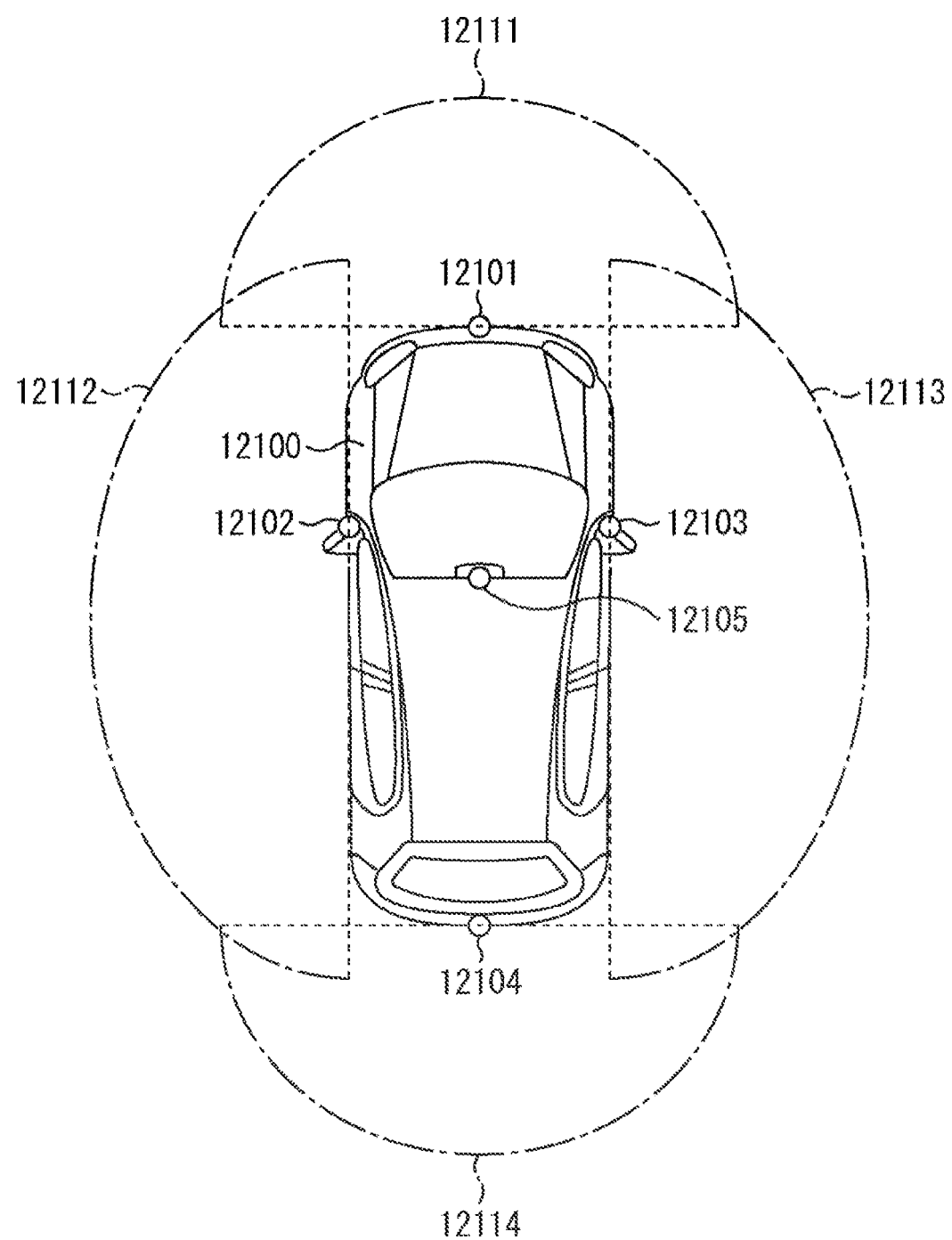
FIG. 20 is a diagram of assistance in explaining an example of installation positions of an outside-vehicle information detecting section and an imaging section.

FIG. 20 is a diagram depicting an example of the installation position of the imaging section 12031.

In FIG. 20, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 20 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 in the configuration described above. Specifically, the ranging apparatus 10 is applicable to the imaging section 12031. The correction table can be updated by executing calibration at necessary timing of calibration such as at the time of a temperature change when the technology according to the present disclosure is applied to the imaging section 12031. Accordingly, more accurate distance information (distance image) can be calculated. As a result, an object can be more accurately recognized at the time of execution of a recognition process using this distance information (distance image), for example.

Note that embodiments according to the present technology are not limited to the embodiments described above, but may be modified in various manners without departing from the subject matters of the present technology.

In addition, the technology according to the present disclosure may have following configurations.

(1)

A ranging system including:

a light source unit that emits light;

a sensor unit that detects reflection light of light emitted from the light source unit and reflected on a target object;

a determination unit that determines whether or not a peripheral object is usable as a reflection object on the basis of a predetermined determination condition; and a generation unit that generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

(2)

The ranging system according to (1) described above, in which the determination unit determines that a second surface that is included in the given target object and has unknown reflectance is usable as the reflection object in a case where a first surface on a side where the light source unit and the sensor unit are provided is in contact with the second surface.

(3)

The ranging system according to (2) described above, in which the ranging system is mounted on an electronic apparatus, and the determination unit determines that the second surface is usable as the reflection object when the electronic apparatus is placed on the target object and comes into such a state where the first surface of the electronic apparatus faces the second surface of the target object.

(4)

The ranging system according to (1) described above, in which the determination unit determines that a second surface that is included in the particular target object and has known reflectance is usable as the reflection object in a case where a first surface on a side where the light source unit and the sensor unit are provided is in contact with or adjacent to the second surface.

(5)

The ranging system according to (4) described above, in which the ranging system is mounted on an electronic apparatus, the particular target object includes a charging stand that has a function of charging the electronic apparatus, and the determination unit determines that the second surface is usable as the reflection object when the electronic apparatus is placed on the charging stand during charge, and comes into such a state where the first surface of the electronic apparatus faces the second surface of the charging stand.

(6)

The ranging system according to (4) described above, in which the ranging system is mounted on an electronic apparatus, the particular target object includes a member fixed to a connector of a cable of a charger connectable to a connection unit of the electronic apparatus, and the determination unit determines that the second surface is usable as the reflection object when the connector is connected to the connection unit of the electronic apparatus during charge, and comes into such a state where the first surface of the electronic apparatus faces the second surface of the member.

(7)

The ranging system according to (1) described above, in which, in a case where a part of a body of a user is in contact with or adjacent to a position near the light source unit and the sensor unit, the determination unit determines that the part of the body of the user is usable as the reflection object.

(8)

The ranging system according to (7) described above, in which the ranging system is mounted on an electronic apparatus, and the determination unit determines that the part of the body of the user is usable as the reflection object when the user brings the part of the body into contact with the position near the light source unit and the sensor unit to use an application executed by the electronic apparatus.

(9)

The ranging system according to (1) described above, in which the determination unit determines that a second surface that is included in the given target object and has unknown reflectance is usable as the reflection object in a case where a first surface on a side where the light source unit and the sensor unit are provided faces in a direction toward the second surface.

(10)

The ranging system according to (9) described above, in which the ranging system is mounted on an electronic apparatus, and the determination unit determines that the second surface is usable as the reflection object when the electronic apparatus is placed on a given object and comes into such a state where a third surface of the electronic apparatus on a side opposite to the first surface faces a fourth surface of the object, and comes into such a state where light from the light source unit is applicable to the second surface of the target object.

(11)

The ranging system according to (1) described above, further including:

a reflection member that has known reflectance, in which the determination unit determines that the reflection member is usable as the reflection object by adaptively controlling a light amount of light from the light source unit in a case where a first surface on a side where the light source unit and the sensor unit are provided faces in a given direction.

(12)

The ranging system according to (11) described above, in which the ranging system is mounted on an electronic apparatus, and the determination unit determines that the reflection member is usable as the reflection object by setting a light amount of light from the light source unit to such an amount that the reflection member receives a sufficient light amount when the given target object is absent in a direction where the first surface of the electronic apparatus faces in a state where the electronic apparatus is used in an open place.

(13)

The ranging system according to (11) or (12) described above, in which the ranging system is mounted on an electronic apparatus, and the determination unit determines that the reflection member is usable as the reflection object when a light amount of light from the light source unit is allowed to be set to such an amount that light does not reach the second surface included in the target object and that the reflection member obtains a sufficient light amount in a case where the first surface of the electronic apparatus placed on a given object faces in a direction toward a second surface included in the given target object and having unknown reflectance.

(14)

The ranging system according to (13) described above, in which the determination unit determines that the second surface is usable as the reflection object when the light amount of light from the light source unit is not allowed to be set to an amount that light does not reach the second surface of the target object and that the reflection member obtains a sufficient light amount.

(15)

The ranging system according to any one of (1) to (14) described above, in which a range image sensor of a TOF (Time Of Flight) type adopting an indirect system is included.

(16)

The ranging system according to any one of (1) to (15) described above, further including:

a ranging apparatus that includes the light source unit and the sensor unit; and a control apparatus that includes the determination unit and the generation unit.

(17)

The ranging system according to any one of (1) to (15) described above, configured as a ranging apparatus that includes the light source unit, the sensor unit, the determination unit, and the generation unit.

(18)

A calibration method performed by a control apparatus, including:

determining whether or not a peripheral object is usable as a reflection object on the basis of a predetermined condition; and generating a correction table for correcting an offset value between a true value of a range value and a measured value on the basis of a detection result received from a sensor unit and obtained by detecting reflection light of light applied from a light source unit to a target object usable as the reflection object in a case where the peripheral object is determined to be usable as the reflection object.

(19)

A program causing a computer to function as:

a determination unit that determines whether or not a peripheral object is usable as a reflection object on the basis of a predetermined determination condition; and a generation unit that generates a correction table for correcting an offset value between a true value of a range value and a measured value on the basis of a detection result received from a sensor unit and obtained by detecting reflection light of light applied from a light source unit to a target object usable as the reflection object in a case where the peripheral object is determined to be usable as the reflection object.

(20)

An electronic apparatus including:

a ranging system that includes a light source unit that emits light, a sensor unit that detects reflection light of light emitted from the light source unit and reflected on a target object, a determination unit that determines whether or not a peripheral object is usable as a reflection object on the basis of a predetermined determination condition, and a generation unit that generates a correction table for correcting an offset value between a true value of a range value and a measured value on the basis of a detection result received from the sensor unit and obtained by detecting reflection light of light applied from the light source unit to a target object usable as the reflection object in a case where the peripheral object is determined to be usable as the reflection object.

REFERENCE SIGNS LIST

10 Ranging apparatus
11 Control unit
12 Light source unit
13 Sensor unit
14 Input/output unit
20 Target object
21 Determination unit
22 Calibration unit
31 Generation unit
100 Electronic apparatus
101 Control unit
102 Touch panel
103 Ranging unit
104 Camera
105 Sensor
106 Memory
107 Communication unit
108 Microphone
109 Speaker
110 Connection unit
111 Power source unit
210 Desk
220 Charging stand
221 Charging connector
222 Member
230 Finger
240 Ceiling
250 Ceiling
1000 Ranging system
1001 Control apparatus

The invention claimed is:

1. A ranging system for mounting on an electronic apparatus, the ranging system comprising:

a light source that emits light;

a sensor that detects reflection light of light emitted from the light source unit and reflected on a target object;

a determination unit that determines whether or not a peripheral object is usable as a reflection object on a basis of a predetermined determination condition; and a generation unit that generates a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object, wherein the determination unit determines that a second surface that is included in the target object and has unknown reflectance is usable as the reflection object in a case where a first surface on a side where the light source and the sensor are provided is in contact with the second surface, the target object includes a charging stand that has a function of charging the electronic apparatus, and the determination unit determines that the second surface is usable as the reflection object when the electronic apparatus is placed on the charging stand during charge, and comes into such a state where the first surface of the electronic apparatus faces the second surface of the charging stand.

2. The ranging system according to claim 1, wherein the determination unit determines that the second surface is usable as the reflection object when the electronic apparatus is placed on the target object and comes into such a state where the first surface of the electronic apparatus faces the second surface of the target object.

3. The ranging system according to claim 1, wherein, in a case where a part of a body of a user is in contact with or adjacent to a position near the light source and the sensor, the determination unit determines that the part of the body of the user is usable as the reflection object.

4. The ranging system according to claim 3, wherein the determination unit determines that the part of the body of the user is usable as the reflection object when the user brings the part of the body into contact with the position near the light source and the sensor to use an application executed by the electronic apparatus.

5. The ranging system according to claim 1, wherein the determination unit determines that a second surface that is included in the target object and has unknown reflectance is usable as the reflection object in a case where a first surface on a side where the light source and the sensor are provided faces in a direction toward the second surface.

6. The ranging system according to claim 5, wherein the determination unit determines that the second surface is usable as the reflection object when the electronic apparatus is placed on a given object and comes into such a state where a third surface of the electronic apparatus on a side opposite to the first surface faces a fourth surface of the target object, and comes into such a state where light from the light source is applicable to the second surface of the target object.

7. The ranging system according to claim 1, further comprising:
a reflection member that has known reflectance, wherein the determination unit determines that the reflection member is usable as the reflection object by adaptively controlling a light amount of light from the light source in a case where a first surface on a side where the light source and the sensor are provided faces in a given direction.

8. The ranging system according to claim 7, wherein the determination unit determines that the reflection member is usable as the reflection object by setting a light amount of light from the light source to such an amount that the reflection member receives a sufficient light amount when the target object is absent in a direction where the first surface of the electronic apparatus faces in a state where the electronic apparatus is used in an open place.

9. The ranging system according to claim 7, wherein the determination unit determines that the reflection member is usable as the reflection object when a light amount of light from the light source is allowed to be set to such an amount that light does not reach the second surface included in the target object and that the reflection member obtains a sufficient light amount in a case where the first surface of the electronic apparatus placed on the target object faces in a direction toward a second surface included in the target object and having unknown reflectance.

10. The ranging system according to claim 9, wherein the determination unit determines that the second surface is usable as the reflection object when the light amount of light from the light source is not allowed to be set to such an amount that light does not reach the second surface of the target object and that the reflection member obtains a sufficient light amount.

11. The ranging system according to claim 1, further comprising:
a range image sensor of a TOF (Time Of Flight) type and configured to adopt an indirect system.

12. The ranging system according to claim 1, further comprising:
a ranging apparatus that includes the light source and the sensor; and
a control apparatus that includes the determination unit and the generation unit.

13. The ranging system according to claim 1, configured as a ranging apparatus that includes
the light source,
the sensor,
the determination unit, and
the generation unit.

14. A ranging system for mounting on an electronic apparatus, wherein, the ranging system comprising:
a light source that emits light;
a sensor that detects reflection light of light emitted from the light source and reflected on a target object;
a determination unit that determines whether or not a peripheral object is usable as a reflection object on a basis of a predetermined determination condition; and
a generation unit that generates a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object, wherein
the determination unit determines that a second surface that is included in the target object and has unknown reflectance is usable as the reflection object in a case where a first surface on a side where the light source and the sensor are provided is in contact with the second surface,
the target object includes a member fixed to a connector of a cable of a charger connectable to a connection unit of the electronic apparatus, and
the determination unit determines that the second surface is usable as the reflection object when the connector is connected to the connection unit of the electronic apparatus during charge, and comes into such a state where the first surface of the electronic apparatus faces the second surface of the member.

15. A ranging system for mounting on an electronic apparatus, the ranging system comprising:
a light source that emits light;
a sensor that detects reflection light of light emitted from the light source and reflected on a target object;
a memory storing a program; and
a processor configured to execute the program to perform operations comprising:
determining whether or not a peripheral object is usable as a reflection object on a basis of a predetermined determination condition,
generating a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object,
determining that a second surface that is included in the target object and has unknown reflectance is usable as the reflection object in a case where a first surface on a side where the light source and the sensor are provided is in contact with the second surface, wherein the target object includes a charging stand that has a function of charging the electronic apparatus, and
determining that the second surface is usable as the reflection object when the electronic apparatus is placed on the charging stand during charge, and comes into such a state where the first surface of the electronic apparatus faces the second surface of the charging stand.

16. A ranging system for mounting on an electronic apparatus, the ranging system comprising:
a light source that emits light;
a sensor that detects reflection light of light emitted from the light source and reflected on a target object;
a memory storing a program; and
a processor configured to execute the program to perform operations comprising:
determining whether or not a peripheral object is usable as a reflection object on a basis of a predetermined determination condition; and
generating a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object, determining that a second surface that is included in the target object and has unknown reflectance is usable as the reflection object in a case where a first surface on a side where the light source and the sensor are provided is in contact with the second surface, wherein the target object includes a member fixed to a connector of a cable of a charger connectable to a connection interface of the electronic apparatus, and determining that the second surface is usable as the reflection object when the connector is connected to the connection interface of the electronic apparatus during charge, and comes into such a state where the first surface of the electronic apparatus faces the second surface of the member.

17. A non-transitory computer readable medium storing a program for controlling a ranging system that is mountable on an electronic apparatus and that includes a light source that emits light and a sensor that detects reflection light of light emitted from the light source and reflected on a target object, the program being executable by a processor to perform operations comprising:

determining whether or not a peripheral object is usable as a reflection object on a basis of a predetermined determination condition, generating a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object, determining that a second surface that is included in the target object and has unknown reflectance is usable as the reflection object in a case where a first surface on a side where the light source and the sensor are provided is in contact with the second surface, wherein the target object includes a charging stand that has a function of charging the electronic apparatus, and determining that the second surface is usable as the reflection object when the electronic apparatus is placed on the charging stand during charge, and comes into such a state where the first surface of the electronic apparatus faces the second surface of the charging stand.

18. A non-transitory computer readable medium storing a program for controlling a ranging system that is mountable on an electronic apparatus and that includes a light source that emits light and a sensor that detects reflection light of light emitted from the light source and reflected on a target object, the program being executable by a processor to perform operations comprising:

determining whether or not a peripheral object is usable as a reflection object on a basis of a predetermined determination condition; and generating a correction table for correcting an offset value between a true value of a range value and a measured value on a basis of a detection result received from the sensor and obtained by detecting reflection light of light applied from the light source to a target object usable as the reflection object in a case where the peripheral object is determined to be usable as the reflection object, determining that a second surface that is included in the target object and has unknown reflectance is usable as the reflection object in a case where a first surface on a side where the light source and the sensor are provided is in contact with the second surface, wherein the target object includes a member fixed to a connector of a cable of a charger connectable to a connection interface of the electronic apparatus, and determining that the second surface is usable as the reflection object when the connector is connected to the connection interface of the electronic apparatus during charge, and comes into such a state where the first surface of the electronic apparatus faces the second surface of the member.

* * * * *